US011913203B2

(12) United States Patent
Wall et al.

(10) Patent No.: US 11,913,203 B2
(45) **Date of Patent: *Feb. 27, 2024**

(54) FLUID-DISPENSING SYSTEMS AND METHODS RELATED THERETO

(71) Applicants: Matthew Dale Wall, Aptos, CA (US); John Oliver Porteous, Roseville, CA (US)

(72) Inventors: Matthew Dale Wall, Aptos, CA (US); John Oliver Porteous, Roseville, CA (US)

(73) Assignee: Matthew Dale Wall, Aptos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/585,628

(22) Filed: Jan. 27, 2022

(65) Prior Publication Data

US 2022/0145603 A1 May 12, 2022

Related U.S. Application Data

(63) Continuation of application No. 16/611,854, filed as application No. PCT/US2018/031924 on May 10, 2018, now Pat. No. 11,268,266.

(60) Provisional application No. 62/503,945, filed on May 10, 2017.

(51) Int. Cl.

| | |
|---|---|
| ***E03C 1/05*** | (2006.01) |
| ***E03C 1/04*** | (2006.01) |
| ***G08B 3/10*** | (2006.01) |
| ***G08B 21/20*** | (2006.01) |

(52) U.S. Cl.

CPC ................ *E03C 1/055* (2013.01); *E03C 1/04* (2013.01); *E03C 1/052* (2013.01); *G08B 3/10* (2013.01); *G08B 21/20* (2013.01); *Y10T 137/9464* (2015.04)

(58) Field of Classification Search

CPC ........................... E03C 1/052; Y10T 137/9464

USPC ......................................................... 137/801

See application file for complete search history.

(56) References Cited

U.S. PATENT DOCUMENTS

| | | | | |
|---|---|---|---|---|
| 2014/0261749 | A1* | 9/2014 | Chen | E03C 1/0404 137/87.01 |
| 2016/0362876 | A1* | 12/2016 | Mainka | E03C 1/04 |
| 2019/0292758 | A1* | 9/2019 | Warsowe | E03C 1/052 |
| 2020/0385965 | A1* | 12/2020 | Green | H02K 11/0094 |
| 2022/0145602 | A1* | 5/2022 | Proulx | E03C 1/052 |

* cited by examiner

*Primary Examiner* — Daphne M Barry

(74) *Attorney, Agent, or Firm* — EcoTech Law Group, P.C.

(57) ABSTRACT

Fluid-dispensing systems and methods relating thereto are described. A method of dispensing fluid includes: (i) receiving, from a temperature encoder, a temperature signal; (ii) receiving, from a flow rate encoder, a flow rate signal; (iii) providing, based on the temperature signal and the flow rate signal, a first amount of power required by a first motor; (iv) providing, based on the temperature signal and the flow rate signal, a second amount of power required by a second motor; (v) opening, based on the first amount of power, the first valve by a first amount of valve opening; (vi) opening, based on the second amount of power, the second valve by a second amount of valve opening; and (vii) facilitating admixing of a first fluid flow at a first fluid flow rate, received from the first valve, and a second fluid flow at a second fluid flow rate, received from the second valve, to create an admixed fluid stream.

21 Claims, 16 Drawing Sheets

FLUID-DISPENSING SYSTEMS AND METHODS RELATED THERETO

RELATED APPLICATION

The present application is a continuation of U.S. patent application Ser. No. 16/611,854 which was filed on Nov. 8, 2019, which claims the benefit from International Application No. PCT/US2018/031924, which was granted an International filing date of May 10, 2018, which in turns claims priority from U.S. Provisional Application having Ser. No. 62/503,945, filed on May 10, 2017, which are incorporated herein by reference for all purposes.

FIELD

The present teachings and arrangements relate generally to fluid-dispensing systems. More particularly, the present teachings and arrangements relate to systems and methods for allowing fluid flow at a desired flow rate and at a desired temperature in a hands-free mode of operation along with, if required, the conventional dispensing operation through a faucet.

BACKGROUND

Various fluid-dispensing systems dispense fluid at a desired flow rate and at a desired temperature in a conventional manner, i.e., through a faucet. In such systems, the fluid flowrate through the faucet is adjusted by using two knobs or a single handle. In the two-knob design, one knob is designated for dispensing cold fluid and the other knob is designated for dispensing hot fluid. In the single-handle design, a single handle is rotated in two different directions, one of which adjusts the fluid flow rate and the other of which adjusts the fluid temperature. Regardless of whether the two-knob design or the single-handle design is used, conventional fluid dispensing systems do not operate in a hands-free mode. There are numerous instances when fluid flow at a desired flow rate and at a desired temperature in a hands-free mode of operation is required along with the conventional dispensing operation through a faucet.

What is, therefore, needed, are improved fluid-dispensing systems and methods that allow hands-free dispensing of fluid at the desired flow rate and temperature.

SUMMARY

To achieve the foregoing, the present teachings provide novel systems and methods for hands-free dispensing of fluid at a desired fluid flow rate and fluid temperature. In one aspect, the present arrangements provide fluid dispensing systems. An exemplar of such fluid dispensing systems includes: (i) a faucet; (ii) a fluid control system; and (iii) a flow rate controller (e.g., a pedal).

The faucet, which dispenses a fluid stream, further includes: (i) a faucet temperature controller; (ii) a mechanical temperature component; (iii) a faucet flow controller; and (iv) a mixing cartridge. The faucet temperature controller receives a desired faucet temperature setting for the fluid stream that is dispensed from the faucet. The mechanical temperature component that is coupled to the faucet temperature controller and based on the desired faucet temperature setting, mechanically admixes a ratio of fluid of a first temperature to fluid of a second temperature to arrive at a temperature for the fluid stream that is dispensed from the faucet. The faucet flow controller receives a desired faucet flow rate setting for the fluid stream that is dispensed from the faucet. The mixing cartridge, which is coupled to the faucet flow controller and based on the desired faucet flow rate setting, dispenses the fluid stream at desired flow rate from the faucet.

The fluid control system includes: (i) a temperature controller; (ii) a flow rate controller; (iii) a flow rate encoder; (iv) a computer; (v) a first motor; (vi) a second motor; (vii) a first fluid valve (hereinafter "first valve"); (viii) a second fluid valve (hereinafter "second valve"); (ix) a first splitter; and (x) a second splitter. The temperature controller includes a temperature setting feature that receives a desired temperature setting for the fluid stream. The temperature controller, which is different from the faucet temperature controller, is coupled to the temperature encoder. In an operative state of the temperature controller and the temperature encoder, the desired temperature setting, received at the temperature controller, is conveyed to the temperature encoder. The temperature encoder, based on the desired temperature setting received at the temperature setting feature, generates a temperature signal for the fluid stream.

The flow rate controller, which is different than the faucet flow rate controller, is coupled to the flow rate encoder and includes a flow rate setting feature that is designed to receive a force of a certain magnitude. The magnitude of force received at the flow rate setting feature is conveyed to the flow rate encoder, and in an operative state of the flow rate controller and the flow rate encoder, the flow rate encoder, based on magnitude of force received, generates a flow rate signal for the fluid stream;

The computer is coupled to the temperature encoder and to the flow rate encoder and, based on temperature signal and the flow rate signal, generates first amount of power and second amount of power. The first motor and second motor are coupled to the computer. The first amount of power generated at the computer is conveyed to the first motor, which in an operative state, generates power for a first amount of valve opening. The second amount of power generated at the computer is conveyed to the second motor, which in an operative state of the fluid control system, generates power for a second amount of valve opening.

The first valve is coupled to the first motor and the power for the first amount of valve opening generated by the first motor is implemented at the first valve. Similarly, the second valve coupled to the second motor and the power for the second amount of valve opening generated by the second motor is implemented at the second valve.

The first splitter has a first dispensing end and a second dispensing end. The first dispensing end is coupled, using a first faucet conduit, with the mechanical temperature component and the second dispensing end is coupled, using a first valve conduit, with the first valve. Thus, fluid of first temperature present at the first fluid splitter is conveyed, through the first valve conduit, to the first valve. In an operative state of the fluid control system, the first valve dispenses a fluid stream at the first temperature through the first amount of valve opening.

The second splitter has a first dispensing end and a second dispensing end. The first dispensing end is coupled, using a second faucet conduit, with the mechanical temperature component and the second dispensing end is coupled, using a second valve conduit, with the second valve. Thus, fluid of second temperature present at the second fluid splitter is conveyed, through the second valve conduit, to the second valve. In an operative state of the fluid control system, the second valve dispenses a fluid stream at the second temperature through the second amount of valve opening.

The first valve and the second valve are coupled, using an admixed fluid conduit, to the faucet, which in an operative state, dispenses admixed fluid stream at admixed flow rate. The admixed fluid stream results from admixing of the fluid stream of the first temperature and the fluid stream of the second temperature at the admixed fluid conduit. The admixed flow rate results from admixing the fluid stream dispensed from the first amount of valve opening and the fluid stream dispensed from the second amount of valve opening. The computer is not coupled to the faucet temperature controller and the faucet flow rate controller.

In one embodiment of the present arrangements, during an operative state the fluid dispensing system, when the first motor and the second motor do not receive information regarding the first amount of power and the second amount of power from the computer, respectively, the faucet receives the fluid stream of the first temperature and the fluid stream of the second temperature from the first splitter and the second splitter, respectively.

In another embodiment of the present arrangements, the computer, the first valve, the second valve, and the first and second motors are enclosed within a single fluid-proof housing. Preferably, the fluid-proof housing includes fluid leak detection device that generates an acoustic alarm when the fluid leak detection device detects a leak.

In yet another embodiment of the present arrangements, the fluid dispending system further includes a power supply that, in an operative state, receives from the computer information regarding the first amount of power and transmits to the first motor and receives from the computer information regarding the second amount of power and transmits to the second motor. The power supply may be AC power or a battery pack.

The present arrangement may also include features to monitor the fluid dispensing system and protect a user using the fluid dispensing system. By way of example, the fluid dispensing system may further include an emergency shutoff valve that prevents transmission of the fluid stream of the first temperature and the fluid stream of the second temperature to the admixed fluid conduit. The fluid dispensing system may also include a fluid metering device to record a flow rate and/or volume of fluid that is dispensed through the faucet. Furthermore, the temperature controller may further include a lockout mechanism that prevents the flow rate controller from transmitting information to the computer.

In one embodiment of the present arrangements, the fluid dispensing system further includes a wireless transmitter for transmitting information to a remote device.

In another embodiment of the present arrangements, the temperature encoder and/or the flow rate encoder are a magnetic encoder or an optical encoder.

In yet another embodiment of the present arrangements, the force receiving feature is a pressure plate. Preferably, the pressure plate includes an internal battery and a wireless transmitter.

In another aspect, the present teachings provide methods of dispensing fluid. An exemplar method of dispensing fluid includes: (i) receiving, from a temperature encoder, a temperature signal indicating a desired temperature for an admixed fluid stream; (ii) receiving, from a flow rate encoder, a flow rate signal indicating a desired flow rate for the admixed fluid stream; (ii) providing, based on the temperature signal and the flow rate signal, a first amount of power required by a first motor communicatively coupled to a first valve that, in an operative state, dispenses a first fluid flow that is at a first temperature; (iii) providing, based on the temperature signal and the flow rate signal, a second amount of power required by a second motor communicatively coupled to a second valve that, in an operative state, dispenses a second fluid flow that is at a second temperature; (iv) opening, based on the first amount of power, the first valve by a first amount of valve opening to dispense the first fluid flow at a first fluid flow rate; (v) opening, based on the second amount of power, the second valve by a second amount of valve opening to dispense the second fluid flow at a second fluid flow rate; and (vi) facilitating admixing the first fluid flow at the first fluid flow rate, received from the first valve, and the second fluid flow at the second fluid flow rate, received from the second valve, to create an admixed fluid stream having the desired temperature and the desired flow rate. A combination of the first fluid flow and the second fluid flow produce the desired temperature for the admixed fluid stream and the first fluid flow rate and the second fluid flow rate add up to equal the desired flow rate of the admixed fluid stream.

In the method above, the providing steps may further include: (i) computing, based on the temperature signal and the flow rate signal, information regarding the first amount of power required by the first motor that is communicatively coupled to the first valve and that dispenses the first fluid flow, and information regarding the second amount of power required by the second motor that is communicatively coupled to the second valve and that dispenses the second fluid flow; and (ii) conveying the first amount of power to the first motor to open the first valve by the first amount and the second amount of power to the second motor to open the second valve by the second amount and the first amount of power dispenses the first fluid flow at a first fluid flow rate and the second amount of power dispenses the second fluid flow at the second fluid flow rate.

In one embodiment of the present teachings, the method of dispensing fluid may further include dispensing the admixed fluid stream from a faucet.

In another embodiment of the present teachings, the method of dispensing fluid further includes receiving, from a temperature controller, the desired temperature of the admixed fluid stream. Preferably, receiving the desired temperature is carried out prior to the receiving the temperature signal.

In yet another embodiment of the present teachings, the method of dispensing fluid further includes receiving, from a flow rate controller, the desired flow rate of the admixed fluid stream. Preferably, receiving the desired flow rate is carried out prior to the receiving the flow rate signal.

During the step of receiving the flow rate signal, in one embodiment of the present teachings, the flow rate signal is commensurate with a force received at the flow rate controller, and the force has a magnitude less than a predefined magnitude of force. In certain instances, however, the flow rate signal is not commensurate with the force received at the flow rate controller. By way of example, a substantially maximum flow rate signal is generated, when an excessive force is received at the flow rate controller. The excessive force is a force having a magnitude greater than the predefined magnitude of force. When an excessive force is applied to the flow rate controller, the fluid flow rate of the admixed fluid stream obtained by receiving the excessive force is substantially similar to the flow rate of the admixed fluid stream obtained by receiving the predefined magnitude of force at the flow rate controller.

The system and method of operation of the present teachings and arrangements, however, together with additional objects and advantages thereof, will be best understood from the following descriptions of specific embodiments when read in connection with the accompanying figures.

DETAILED DESCRIPTION OF THE PREFERRED EMBODIMENTS

In the following description, numerous specific details are set forth in order to provide a thorough understanding of the present teaching and arrangements. It will be apparent, however, to one skilled in the art that the present teaching and arrangements may be practiced without limitation to some or all of these specific details. In other instances, well-known process steps have not been described in detail in order to not unnecessarily obscure the present teachings and arrangements.

The present arrangements and methods provide control of flow rate and/or temperature of fluid exiting a fluid-dispensing feature (e.g., a faucet) independent of hand-operated control of flow rate of fluid and fluid temperature. In one embodiment, the present arrangements provide systems for hands-free control of fluid flow rate and/or temperature using one or more devices (e.g., flow rate controller 106 and temperature controller 116 of FIG. 1A) located remote from a faucet in one operative state, but allows hand-operated control of fluid flow rate and/or temperature in another operative state. In this embodiment, use of the term "remote" conveys that the device is located a distance away from the faucet. Furthermore, each remote device may be any apparatus that, when activated, controls the flow rate and/or temperature of the dispensed fluid. The present arrangements allow a user to complete everyday tasks (e.g., washing hands and dishes, and cleaning food) more quickly, more easily, and with improved hygiene over the conventional fluid dispensing systems (e.g., hand operated and touch or motion sensor enabled control of fluid temperature and fluid flow rate). By way of example, the systems of the present arrangements allow for near instantaneous starting and stopping of the flow of fluid in a hands-free manner. The user, without removing or disengaging their hands from the task in which the user is engaged, is able to quickly turn on and off the fluid flow dispensed from the fluid-dispensing feature. This allows near instantaneous control of fluid flow, minimizes fluid waste that occurs in conventional fluid dispensing systems when the user disengages from the task being performed to turn on or off the fluid flow. Where sensors are used in conventional fluid dispensing system, fluid waste occurs during an activation and deactivation sensor delays. Furthermore, the fluid-dispensing systems of the present arrangements, allow the user to adjust fluid flow rate in a hands-free manner to provide only the amount of fluid flow necessary for a given task, thus reducing fluid waste and increasing fluid savings.

Figure 1A:
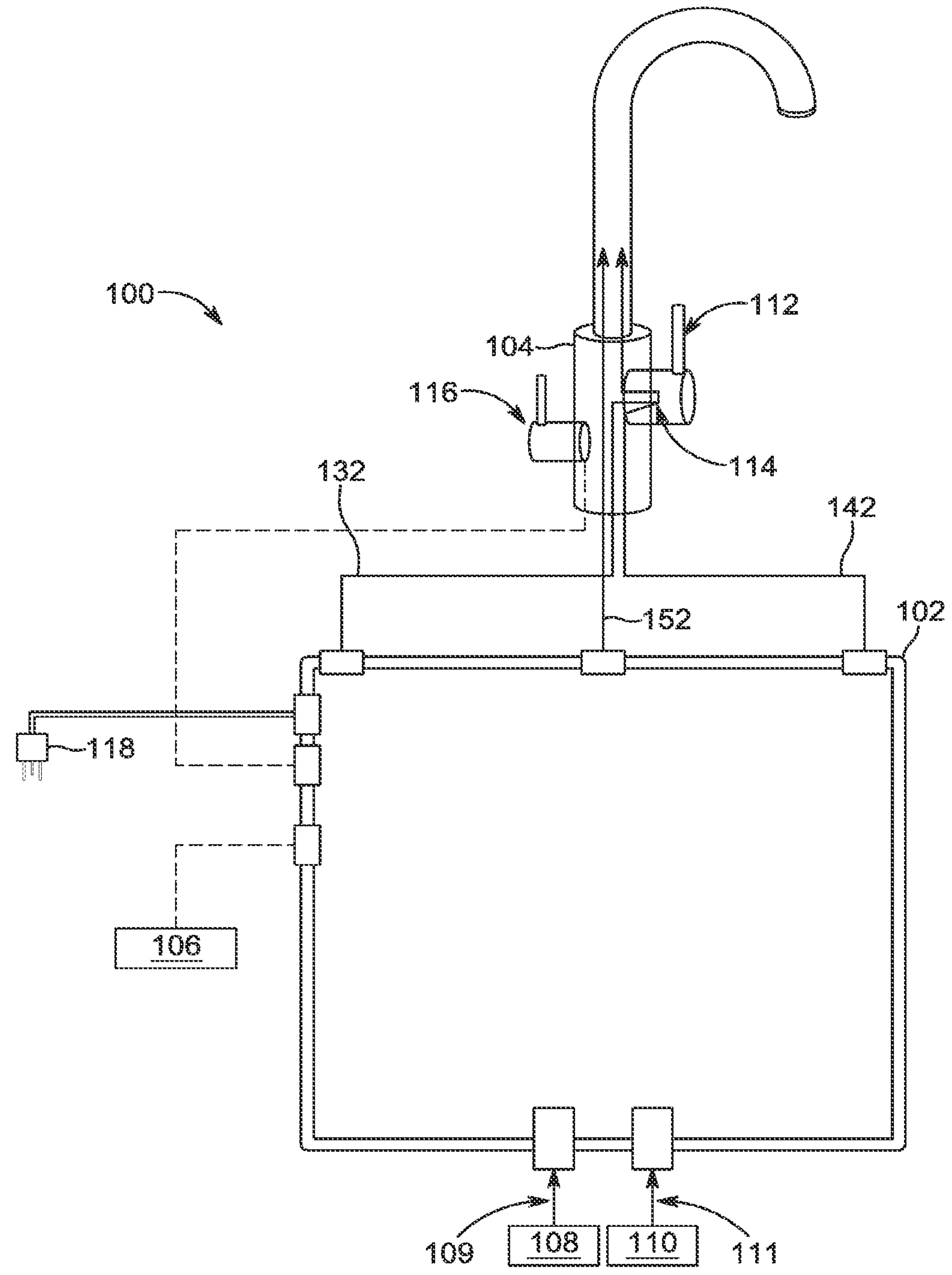
FIG. 1A shows a schematic view of a fluid-dispensing system, according to one embodiment of the present arrangements and that includes a faucet, a fluid control system, and a flow rate controller.

FIG. 1A shows a fluid-dispensing system 100, according to one embodiment of the present arrangements. Fluid-dispensing system 100 includes a fluid control system 102 communicatively coupled to a faucet 104 and a flow rate controller 106. Fluid control system 102 receives a fluid of a first temperature (hereafter referred to as a "hot fluid") and a fluid of a second temperature (hereinafter a "cold fluid") from a fluid source of a first temperature (hereafter referred to as a "hot fluid source") 108 and a fluid source of a second temperature (hereinafter referred to as a "cold fluid source") 110, respectively. A conduit of a first fluid temperature (hereinafter referred to as a "hot fluid conduit" 109 and a conduit of a second fluid temperature (hereinafter referred to as a "cold fluid conduit) 111 couples hot fluid source 108 and cold fluid source 110, respectively, to fluid control system 102. Hot fluid source 108 and cold fluid source 110 may be from any source that provides hot and cold fluid. By way of example, hot and cold fluid may be from a building's plumbing system or from on demand or tankless fluid heater.

Fluid control system 102 transmits multiple fluid flows, via conduits, to faucet 104. By way of example, a faucet conduit of a first fluid temperature (hereinafter referred to as a "first faucet conduit") 132 transmits hot fluid from fluid control system 102 to faucet 104. Similarly, a faucet conduit of a second fluid temperature (hereinafter referred to as a "second faucet conduit" 142 transmits cold fluid from fluid control system 102 to faucet 104. The hot and cold fluid are admixed in a mechanical temperature component 114. A faucet temperature controller 112 adjusts the ratio of hot and cold fluid received in mechanical temperature component 114 from first faucet conduit 132 and second faucet conduit 142. Thus, the temperature of the fluid flow exiting faucet 104 may be adjusted by increasing or decreasing the fluid flow rate of the hot and/or cold fluid streams. A faucet flow controller (not shown to simplify illustration) coupled to a mixing cartridge may be engaged to start, stop, or adjust flow rate of the admixed fluid stream exiting out of the faucet.

In addition to first faucet conduit 132 and second faucet conduit 142, an admixed fluid conduit 152 transmits admixed fluid from fluid control system 102 to faucet 104. Admixed fluid conduit 152 provides admixed fluid to faucet 104 that is independent of first faucet conduit 132 and second faucet conduit 142. As will be discussed in greater detail below with respect to FIG. 1D, the flow rate and temperature of the admixed fluid in admixed fluid conduit 152 is not controlled by faucet temperature controller 112 or a faucet's control adjusting means. Rather, temperature and flow rate of the admixed fluid is controlled by inputs from flow rate controller 106 alone or flow rate controller 106 in conjunction with temperature controller 116.

Temperature controller 116 may include a temperature encoder (e.g., an optical, capacitive, or magnetic rotary encoder) that translates movement (e.g., degree of rotation) of temperature controller 116 into electronic information that is received by fluid control system 102. Preferably, temperature controller 116 is in close proximity to faucet 104 to allow a user to quickly change the temperature as needed and to provide an immediate visual recognition of the current temperature setting. More preferably, temperature controller 116 is coupled to faucet 104.

Fluid control system 102 is also capable of receiving information from flow rate controller 106, which includes a force-receiving feature (e.g., pressure plate 776 of FIG. 7) that allows a user to exert a force to request a desired fluid flow rate from faucet 104. In one embodiment of the present arrangements, a flow rate encoder (e.g., encoder 1010 of FIG. 10) translates the force exerted by the user on the force-receiving feature (e.g., force-receiving feature 1076 of FIG. 10) to electronic information that is transmitted to fluid control system 102. In another embodiment of the present arrangements, a force-sensing resistor (e.g., force-sensing resister 788 of FIG. 7B) or a force-sensing linear potentiometer (e.g., force-sensing linear potentiometer 994 of FIG. 9B) translates the force exerted by a user to electronic information that is transmitted to fluid control system 102. A wired and/or wireless connection allows flow rate controller 106 to transmit information related to a fluid flow rate and/or fluid temperature to fluid control system 102. Preferably, flow rate controller 106 is mounted in a position that can be contacted by a user. More preferably, flow rate controller 106 is located close to the ground in close proximity to a foot of a user and far away from faucet 104 where a fluid stream is dispensed.

Figure 1B:
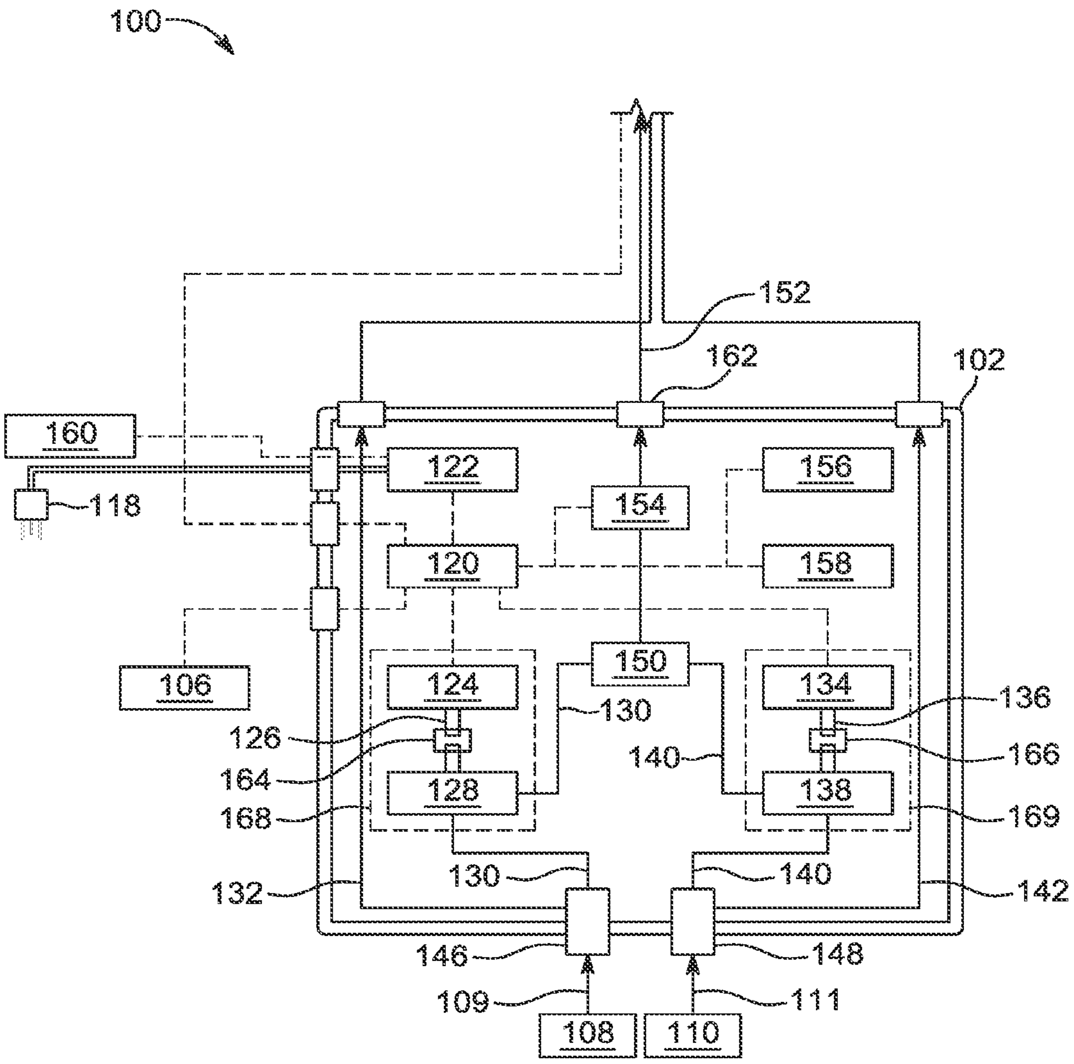
FIG. 1B shows a schematic view of the fluid control system of FIG. 1A, according to one embodiment of the present arrangements.

FIG. 1B shows a schematic of fluid control system 102 of FIG. 1A, according to one embodiment of the present teachings. Preferably, fluid control system 102 is housed inside a faucet cabinet or in any cabinet located in proximity to the faucet. Fluid control system 102 includes a computing device (hereinafter a "computer") 120, which receives power from a power supply 122. A battery system 160 and/or an electrical plug 118 provide power to power supply 122. Computer 120 receives information from flow rate controller 106 and/or temperature controller 116 regarding a desired fluid flow rate and desired fluid temperature and transfers the information to a first motor 124 and a second motor 134. First motor 124 and second motor 134 are configured to engage a corresponding first valve stem 126 and second valve stem 136 respectively. Thus, first motor 124 and second motor 134, in one embodiment of the present arrangements, engage first valve stem 126 and second valve stem 136, respectively, to block or open a first valve 128 and a second valve 138, respectively. In one preferred embodiment of the present arrangements, first motor 124 and second motor 134 are servomotors A first valve coupler 164 couples first motor 124 to first valve stem 126 and second motor 134. In an assembled configuration, first motor 124, the first valve coupler 164, first valve stem 126, and first valve 128 is hereinafter also referred to as a first valve subassembly 168. Similarly, a second valve coupler 166 couples second motor 134 to second valve stem 136. In an assembled configuration, second motor 134, second valve coupler 166, second valve stem 136, and second valve 138 is hereinafter also referred to as a second valve subassembly 169. In this configuration, first motor 124 is only associated with first valve stem 126, and not second valve stem 136. Similarly, second motor 134 is only associated with second valve stem 136, and not first valve stem 126. Thus, first motor 124 of first valve subassembly 168 only drives first valve 128 and second motor 134 of second valve subassembly 169 only drives second valve 138.

Engagement of first valve stem 126 by first motor 124 blocks or creates a fluidic pathway defined between a valve inlet and a valve outlet of a first valve 128 and engagement of second valve stem 136 by second motor 134 blocks or creates a fluidic pathway defined between a valve inlet and a valve outlet of second valve 138. In another embodiment of the present arrangements, first valve 128 and second valve 138 are rotary valves. Each rotary valve includes one or more ceramic discs, each disc having defined therein an aperture through which fluid may traverse. The disc may be rotated to obstruct and/or create the fluidic pathway through the valve. During one operative state of fluid control system 102, first valve stem 126 and second valve stem 136 may rotate a valve disc to a position where the disc aperture is in complete alignment, partial alignment or out of alignment with the fluidic pathway through first valve 128 or second valve 138. Thus, fluid that passes through valve 128 or 138 is partially or completely blocked. If the disc aperture is partially aligned with the fluidic pathway of first valve 128 or second valve 138, then a reduced or increased flow rate through valve 128 or 138 is realized.

First splitter 146 receives hot fluid from hot fluid conduit 109 and transmits the hot fluid to mechanical temperature component 114 or first valve 128. More particularly, a first dispensing end of first splitter 146 is coupled, using a first faucet conduit 132, to mechanical temperature component 114 and a second dispensing end is coupled, using a first valve conduit 130, to first valve 128.

Second splitter 148 receives cold fluid from cold fluid conduit 111 and transmits the cold fluid to mechanical temperature component 114 or second valve 138. A first dispensing end of second splitter 148 is coupled, using a second faucet conduit 142, to mechanical temperature component 114 and the second dispensing end is coupled, using second valve conduit 140, to second valve 138.

Junction 150 is coupled to and designed to receive hot fluid from first valve 128 and cold fluid from second valve 138 to create and admixed fluid flow. Admixed fluid conduit 152 may receive the admixed fluid flow from junction 150 and transmits the admixed fluid flow to faucet 104. In one embodiment of the present arrangements, admixed fluid conduit 152 is coupled to an emergency shutoff valve 154, which in certain predetermined instances prevents the admixed fluid from being transmitted to faucet 104. By way of example, shutoff valve 154 may prevent flow to faucet 104 in the event of a power failure when valves 128 and 138 are open and fluid flow is passing through them. Preferably, shutoff valve 154 is a normally closed solenoid valve. When the power is off to fluid control system 102, shutoff valve 154 will automatically move into a closed position to prevent the flow of fluid. Shutoff valve 154 may also be instructed by computer 120 to close if computer 120 detects a motor or valve failure.

Fluid control system 102 may also include a wireless transmitter 156 (e.g., Wi-Fi, Bluetooth, or Near Field Communication ("NFC")) to transmit and/or receive information to another device, such as a mobile device. Fluid control system 102 may also include a leak detection sensor 158 to determine if there is a leak within fluid control system 102. In one embodiment of the present arrangements, if a leak is detected by leak detection sensor 158, computer 120 instructs emergency shutoff valve 154 to prevent admixed fluid flow to faucet 104.

Preferably, one or more connecting components (e.g., male and female thread components) 162 allows fluid conduits internal to fluid control system 102 to connect complimentary conduits that are external to the same fluid control system. By way of example, connecting component 162 couples an internal portion to an external portion of the same admixed fluid conduit 152.

In one embodiment of the present arrangements, fluid control system 102 includes a housing (e.g., housing 344 of FIGS. 3A and 3B) designed to enclose the components described above. Preferably, the housing is made of a fluid-proof housing and includes external multi-colored LED health indicator lights that a user can view on the outside of the housing to verify if fluid-dispensing system 100 is functioning properly (e.g., verify if first motor is working properly and rotating first valve).

Figure 1C:
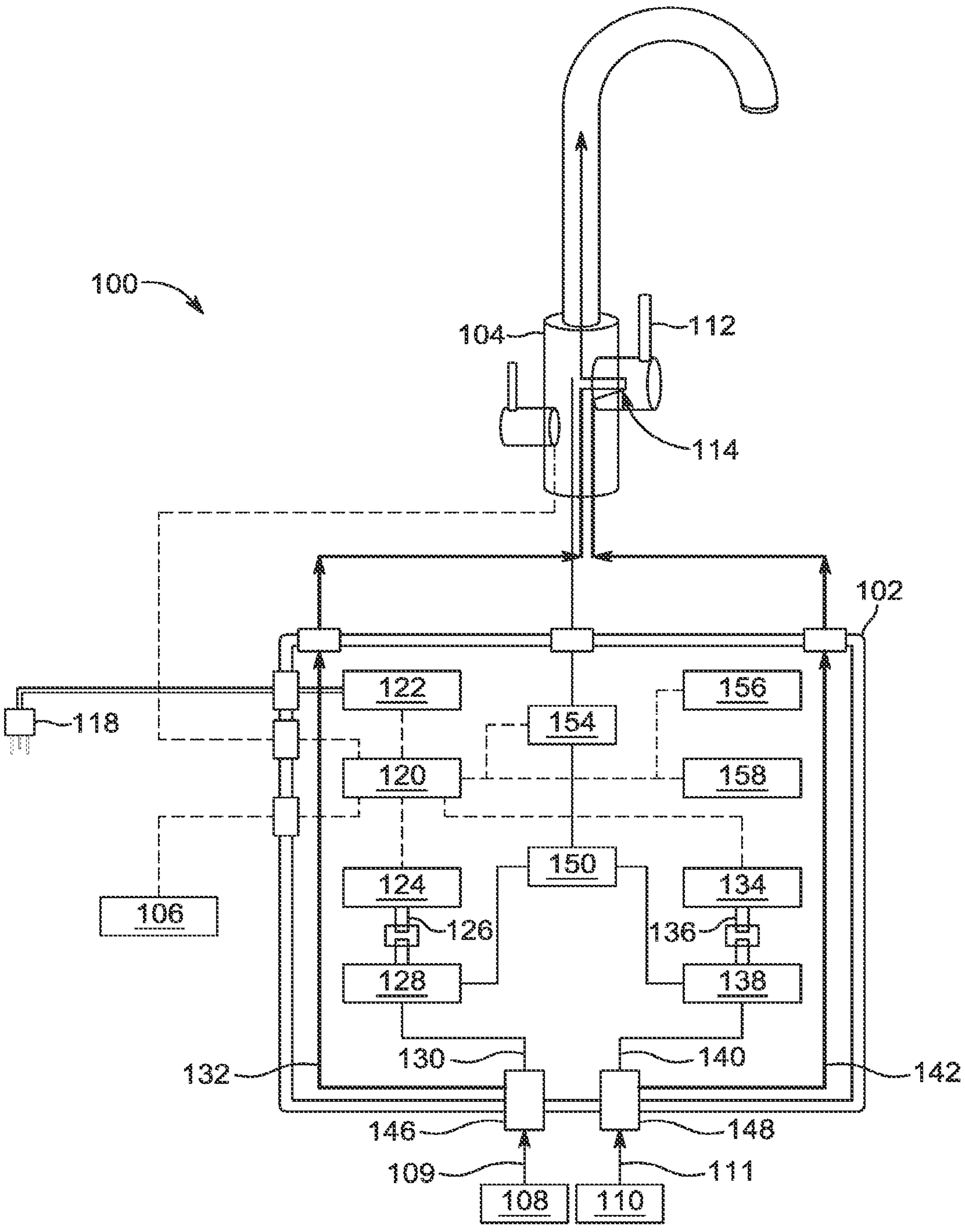
FIG. 1C shows a fluid flow path, according to one embodiment of the present arrangements, within the fluid control system of FIG. 1B.

FIG. 1C shows the fluid-dispensing system 100 of FIG. 1A in an operative state, according to one embodiment of the present arrangements. In this embodiment, foot flow rate controller 106 is not engaged and faucet 104 receives and dispenses fluid at a desired flow rate and desired temperature (i.e., receiving hot fluid from a first faucet conduit 132 and cold fluid from a second faucet conduit 142, mixing the hot and cold fluid, and dispensing the hot/cold fluid). In this operational state of fluid-dispensing system 100, by default, motors 124 and 134 engage with valves 128 and 138, respectively, to prevent any fluid from traversing through valves 128 and 138, respectively. As a result, the hot fluid received by first splitter 146 is transferred to first faucet conduit 132 and the cold fluid received by second splitter 148 is transferred to second faucet conduit 142. Mechanical temperature component 114, in faucet 104, admixes the hot and cold fluid and a mixing cartridge dispenses the admixed fluid according to the flow rate set by a flow adjusting means and the temperature set by faucet temperature-control mechanism 112.

Figure 1D:
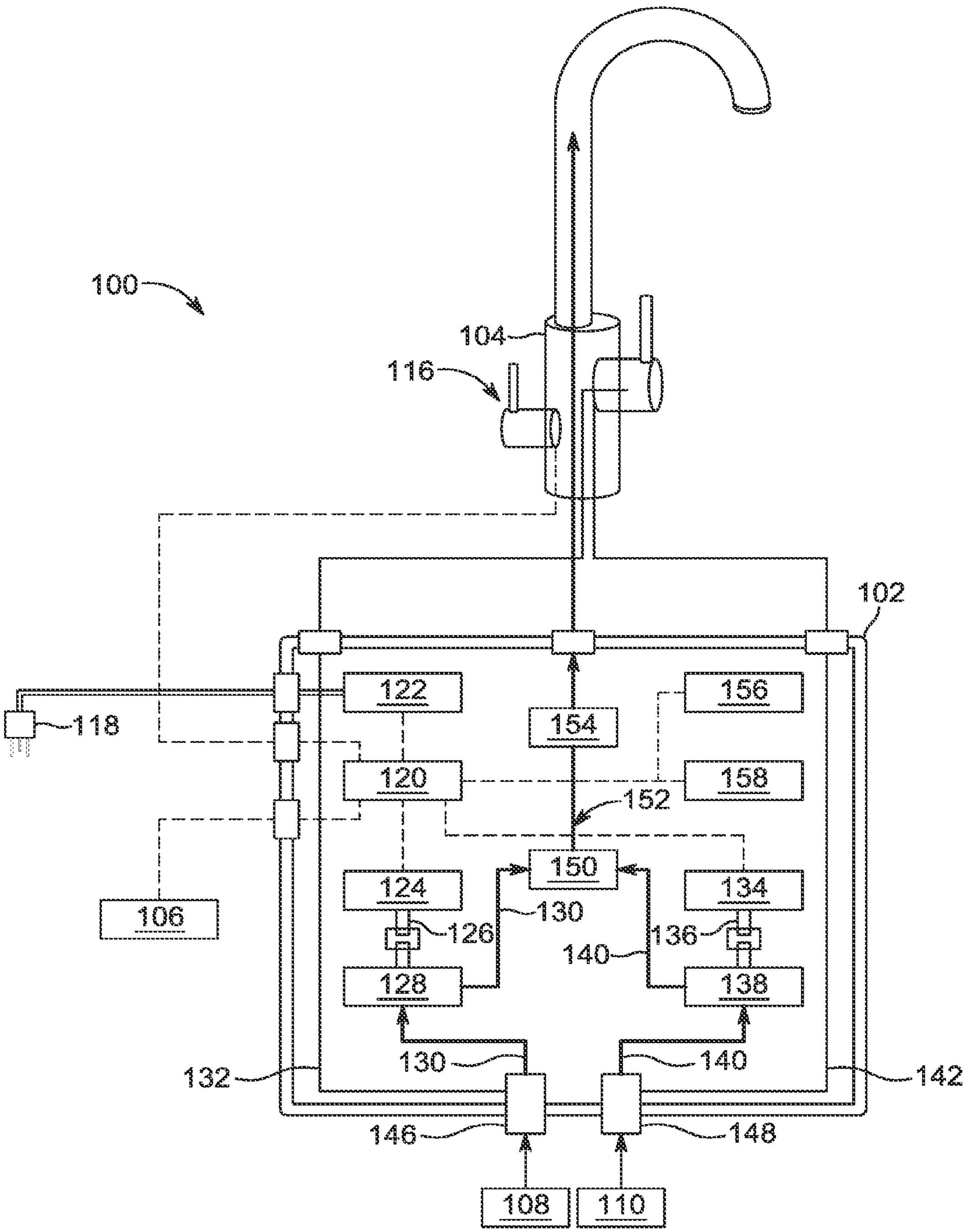
FIG. 1D shows another fluid flow path, according to another embodiment of the present arrangements, within the fluid control system of FIG. 1B.

FIG. 1D shows another operative state of fluid-dispensing system 100 of FIG. 1A, according to one embodiment of the present arrangements. In this embodiment, flow rate controller 106 is engaged by a user to control flow rate of fluid exiting faucet 104. This allows a user to quickly and easily turn on, turn off, and adjust the fluid flow rate in a hands-free mode. Computer 120 receives temperature information from temperature controller 116, indicating a desired temperature for a fluid stream dispensed from faucet 104. Computer 120 also receives flow rate information (hereinafter also referred to as a "flow rate signal") from flow rate controller 106, indicating a desired flow rate for the fluid stream. As will be discussed in greater detail below, using the temperature information and flow rate information, computer 120 determines how much power should be sent to first motor 124 and second motor 134 to obtain a fluid stream of the appropriate temperature and flow rate. Computer 120 determines a hot fluid flow rate and a cold fluid flow rate that, when combined, create the appropriate temperature and flow rate from faucet 104.

Computer 120 transfers information regarding an amount of motor power to motors 124 and 134, which opens valves 128 and 138, respectively, to achieve the appropriate flow rates of hot and cold fluid. In this operative state fluid-dispensing system 100, the flow adjusting means and temperature controller 112 of the faucet are not engaged. Thus, hot fluid and cold fluid do not flow through first faucet conduit 132 and second faucet conduit 142 to faucet 104. Rather, hot fluid received by first splitter 146 is transmitted, through first valve conduit 130, to first valve 128, and hot fluid received by second splitter 148 is transmitted, through second valve conduit 140, to second valve 138.

Hot and cold fluid transferred through first and second valves 128 and 138, respectively, are received by junction 150 and then transmitted to faucet 104 through admixed fluid conduit 152 at the appropriate temperature and flow rate.

In another embodiment of the present arrangements, when flow rate controller 106 is engaged to control fluid flow rate, a user controls temperature of the fluid stream with temperature controller 116 or flow rate controller 106. In this configuration, foot flow rate controller 106 controls both fluid flow rate and fluid temperature. As will be discussed in greater detail below with respect to FIGS. 8A, 8B, 9A, and 9B, a user may adjust a fluid temperature using flow rate controller 106 by applying pressure to different locations on a contacting surface (e.g., contacting surface 882 of FIG. 8) of flow rate controller 106. Computer 120 receives flow rate and temperature information from flow rate controller 106, indicating a desired flow rate and temperature for the fluid stream and transmits that information to first motor 124 and second motor 134 to obtain the desired flow rate and temperature.

The present teachings recognize that fluid-dispensing system 100 may be used in various environments (e.g., kitchen or bathroom), though a location to install fluid control system 102 within each environment may be limited. To this end, the present teachings provide two embodiments of fluid control system 102, as shown and described in FIG. 2 and FIGS. 3A and 3B. Each configuration allows for installation of fluid control system 102 depending on space available for installation. Furthermore, these configurations include a fluid manifold that directs fluid flow within fluid control system 102 to each valve and/or external conduits. As will be shown below with reference to FIG. 2, the fluid manifold replaces numerous components within fluid control system 102. Such reduction in components simplifies manufacturing because there are fewer components to produce. The fluid manifold also simplifies installation because fewer components are needed to assemble fluid control system 102.

Figure 2:
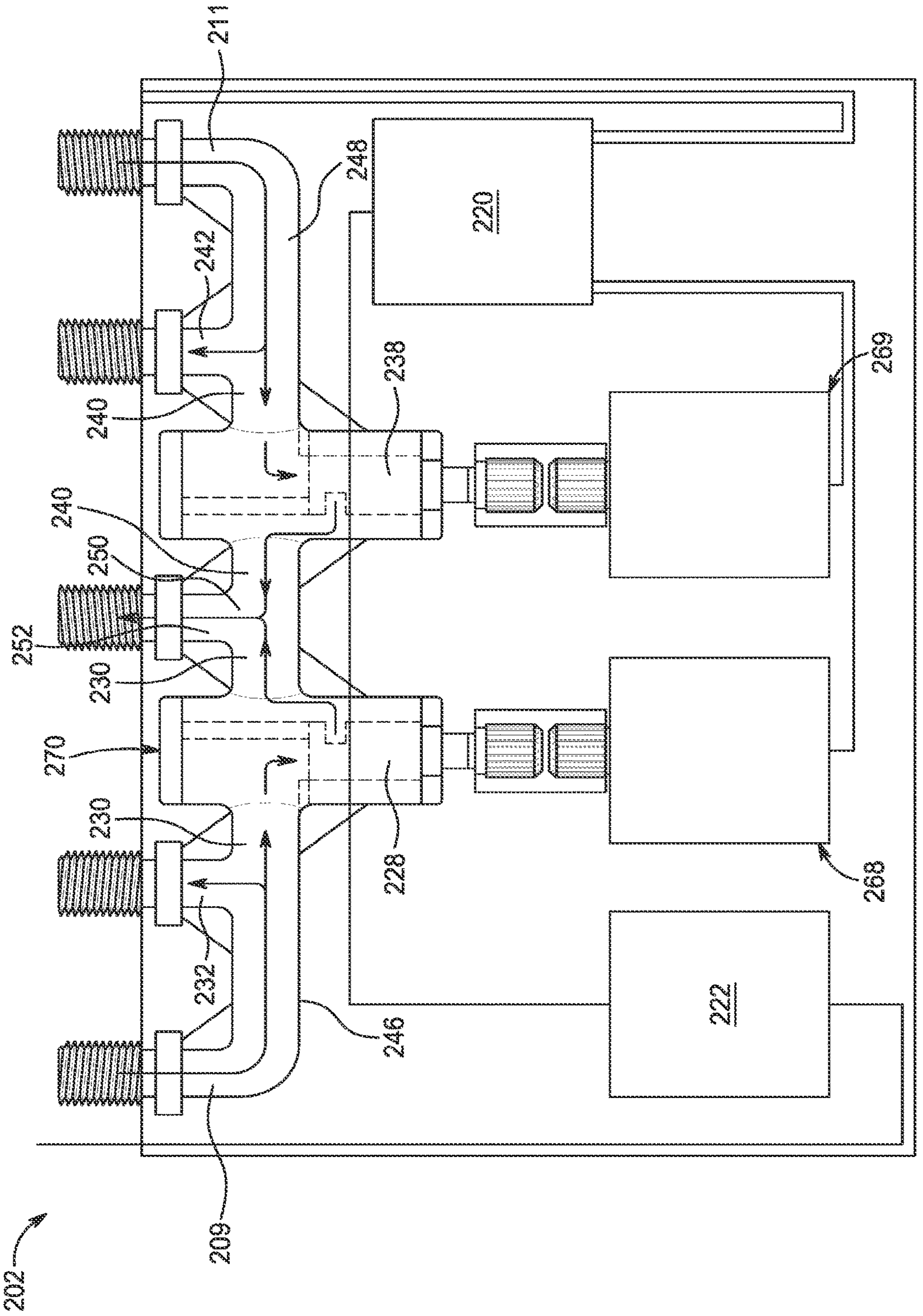
FIG. 2 shows a schematic view of the fluid control system of FIG. 1A, according to another embodiment of the present arrangements and that includes a fluid manifold of a first type.

FIG. 2 shows a fluid control system 202, according to another embodiment of the present arrangements. Fluid control system 202 is substantially similar to fluid control system 102 of FIGS. 1B-D. Fluid control system 202 includes a fluid manifold 270. Fluid manifold 270 has included therein a hot fluid conduit 209, a cold fluid conduit 211, a first valve conduit 230, a first faucet conduit 232, a second valve conduit 240, a second faucet conduit 242, a first splitter 246, second splitter 248, a junction 250, and an admixed fluid conduit 252, which are substantially similar to their counterparts in FIGS. 1B-1D (i.e., hot fluid conduit 109, cold fluid conduit 111, first valve conduit 130, first faucet conduit 132, second valve conduit 140, second faucet conduit 142, first splitter 146, second splitter 148, junction 150, and admixed fluid conduit 152). Furthermore, each conduit, splitter and junction included in fluid manifold 270 functions in a substantially similar manner as its counterpart in FIG. 1. By way of example, first splitter 246 receives hot fluid from hot fluid conduit 209 and directs the hot fluid to first faucet conduit 232 or first valve conduit 230. As a result, when fluid manifold 270 is coupled to a first valve subassembly 268 and a second valve subassembly 269, it receives hot and cold fluid, and dispenses the hot and cold fluid or an admixed fluid to a faucet (e.g., faucet 104 of FIG. 1A).

A computer 220, a power supply 222, first valve subassembly 268 and second valve assembly 269 are substantially similar to their counterparts in FIG. 1B (i.e., computer 120, power supply 122, first valve subassembly 168, and second valve assembly 169). Computer 220 and power supply 222 may be disposed within fluid control system 202 or coupled to an external portion of fluid control system 202.

The design of fluid manifold 270 ensures that fluid control system 202 has a relatively narrow profile. To accomplish this, the conduits of fluid manifold 270 that may be coupled to an external conduit (e.g., hot fluid conduit 209, first faucet conduit 232, first valve conduit 230, admixed fluid conduit 252, second valve conduit 240, second faucet conduit 242, and cold fluid conduit 211) are linearly arranged and extend in the same direction.

Furthermore, first valve subassembly 268 and second valve assembly 269 are also linearly arranged with respect to the conduits of fluid manifold 270 that couple to external conduits. However, in those embodiments where a portion of first valve 228 is coupled to and disposed with fluid manifold 270, first valve subassembly 268 extends in a direction that is opposite (i.e., disposed 180 degrees with respect to) the above-mentioned conduits of fluid manifold 270. Likewise, in those embodiments where a portion of second valve 238 is coupled to and disposed within fluid manifold 270, second valve subassembly 269 extends in the same direction as first valve assembly 268. Thus, rather than extending beyond fluid control system 202, first and second valve subassemblies 268 and 269 extend within fluid control system 202.

The positioning of fluid manifold 270, first valve subassembly 268, and second valve subassembly 268 in a linear arrangement provides for fluid control system 202 that has a relatively narrow profile in one direction. In an assembled configuration, fluid control system 202 couples to external conduits along a single surface of fluid control system 202 and extend in the same linear direction. Thus, coupling the external conduits is made easier by allowing connection to fluid control system 202 along one linear location and reduces the length of external conduit need to couple fluid control system 202 to a faucet and/or hot and cold fluid sources. This narrow profile also allows for installation of fluid control system 202 in locations where there is minimal space between a mounting surface and other object (e.g., existing plumping) in close proximity to the mounting surface.

Figure 3A:
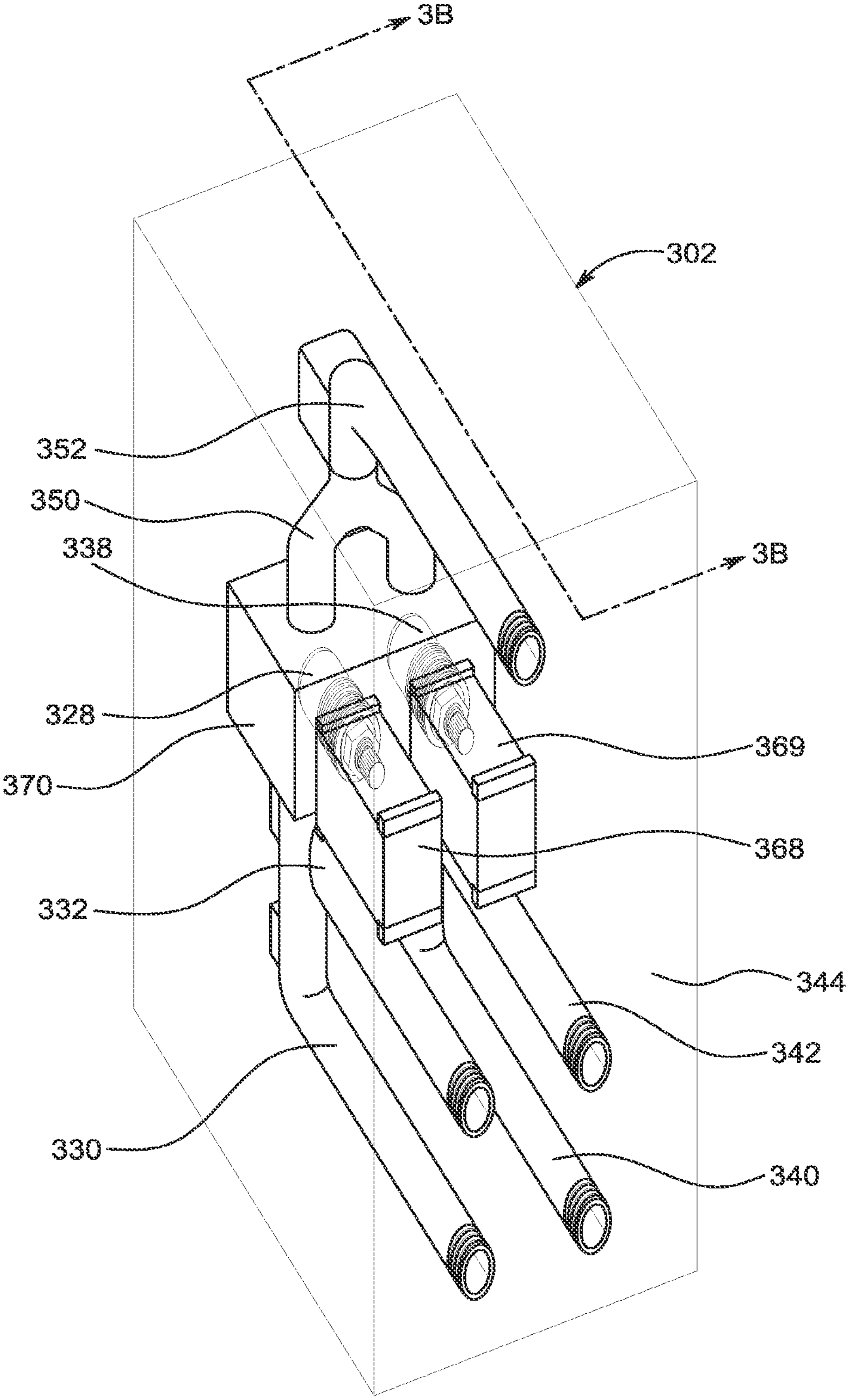
FIG. 3A shows a perspective view of the fluid control system of FIG. 1A, according to yet another embodiment of the present arrangements and that includes a fluid manifold of a second type.
Figure 3B:
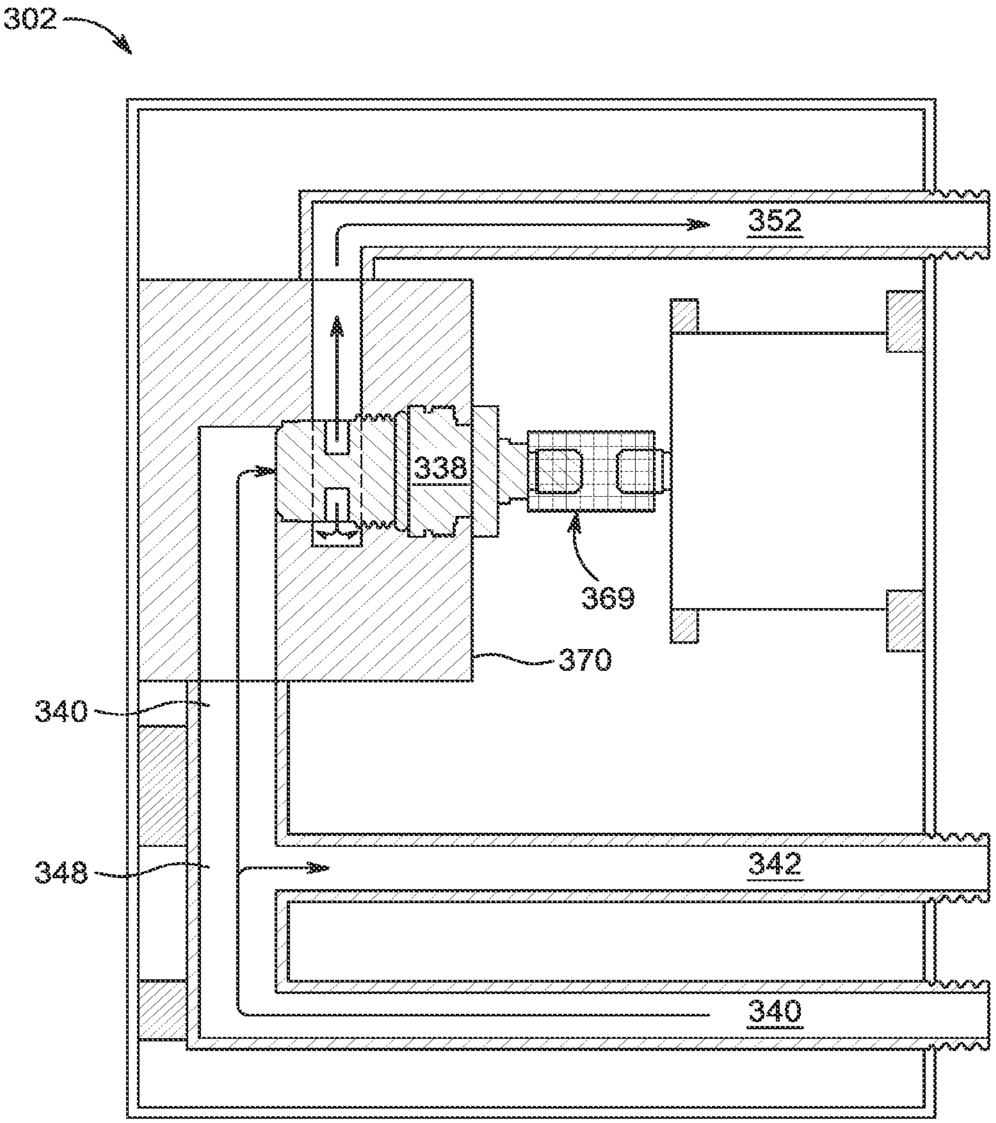
FIG. 3B shows a cross-sectional view of the fluid control system of FIG. 3A.

FIGS. 3A and 3B show a fluid control system 302, according to another embodiment of the present arrangements and that includes a fluid manifold 370 that has a different design than fluid manifold 270 of FIG. 2. Whereas fluid manifold 270 couples to multiple external conduits in a linear alignment, fluid manifold 370 couples to multiple external conduits in nonlinear, compact arrangement.

Fluid manifold 370, which is substantially similar to fluid manifold 270 of FIG. 2, includes a hot fluid conduit 309, a cold fluid conduit 311, a first valve conduit 330, a first faucet conduit 332, a second valve conduit 340, a second faucet conduit 342, a first splitter 346, a second splitter 348, a junction 350, and an admixed fluid conduit 352, which are substantially similar to their counterparts in FIGS. 1B-1D (i.e., hot fluid conduit 109, cold fluid conduit 111, first valve conduit 130, first faucet conduit 132, second valve conduit 140, second faucet conduit 142, first splitter 146, second splitter 148, junction 150, and admixed fluid conduit 152).

In addition to fluid manifold 370, fluid control system 302 includes a housing 344, a first valve subassembly 368 and a second valve subassembly 369 which are substantially similar to their counterparts in FIG. 2 (i.e., housing 244, first valve subassembly 268, and second valve subassembly 269).

In the configuration shown in FIGS. 3A and 3B, first valve subassembly 368, when a portion of first valve 328 is coupled to and disposed within fluid manifold 370, is arranged in close proximity to and extends in the same linear direction as first valve conduit 330, first faucet conduit 332, and admixed fluid conduit 352. Second valve subassembly 369, when a portion of second valve 338 is coupled to and disposed within fluid manifold 370, extends in the same linear direction as second valve conduit 340, second faucet conduit 342, and admixed fluid conduit 352. This configuration creates a compact fluid control system 302. External conduits that may be coupled to fluid control system 302 are similarly arranged adjacent to each other in a compact region. This compact profile allows for installation of fluid control system 302 in locations where there is minimal space between a mounting surface and other object(s) (e.g., existing plumping) in close proximity to the mounting surface. A power supply and a computer, not shown to simplify illustration, may be secured within housing 344, or on an outside surface of housing 344. In a preferred embodiment of the present arrangements, fluid manifold 370 is 3D printed or cast as a single component. As discussed above, a single component fluid manifold 370 has several production, assembly, and installation advantages.

Figure 4:
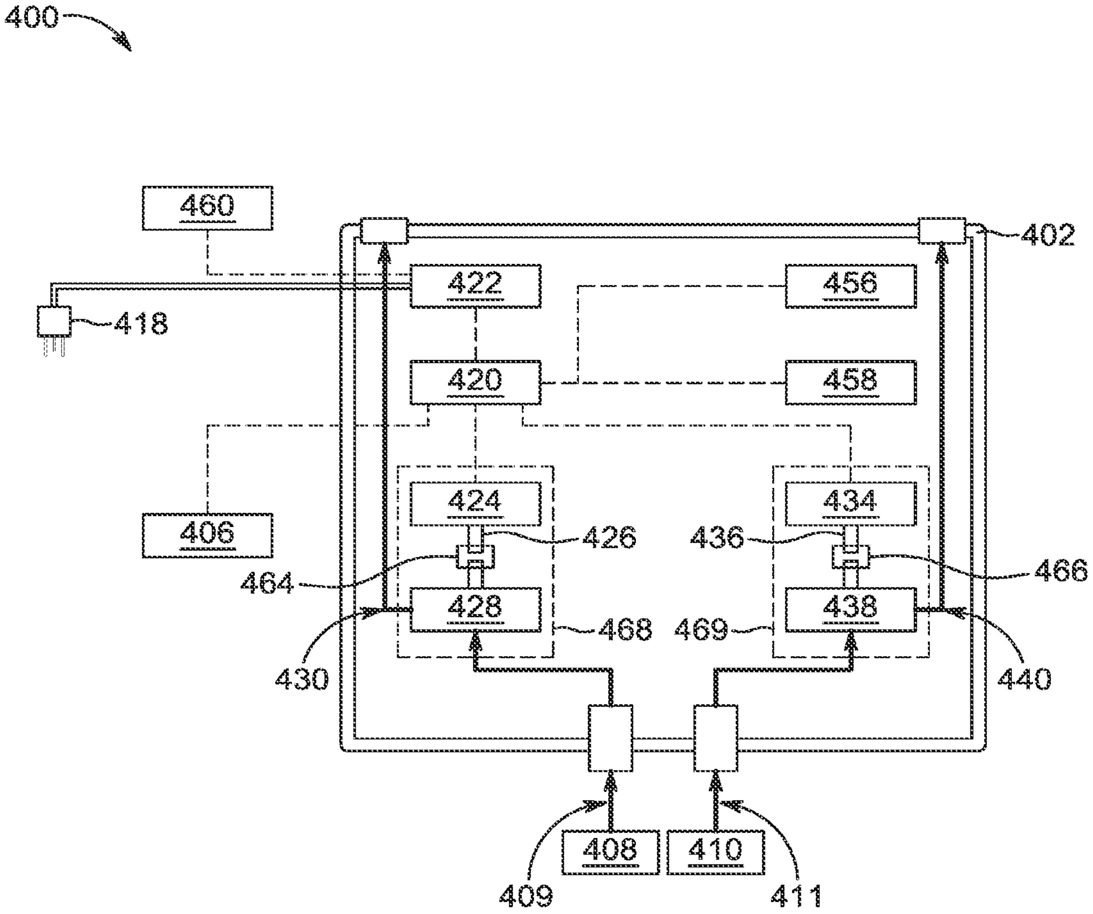
FIG. 4 shows a schematic view of a fluid-dispensing system, according to another embodiment of the present arrangements and that includes a fluid control system and a flow rate controller.

The embodiments shown in FIGS. 1A-1D, 2, and 3A-3B provide a fluid-dispensing system for hands-free control of fluid flow rate and/or temperature using a flow rate controller in one operative state, but also allow for hand-operated control of fluid flow rate and/or temperature in another operative state. Certain embodiments of the present arrangements also provide for hands-free control of flow rate and/or temperature using a flow rate controller only. By way of example, FIG. 4 shows a schematic view of a fluid-dispensing system 400, according to another embodiment of the present arrangements and that includes a fluid control system 402 and a flow rate controller 406.

Unlike fluid-dispensing system 100 of FIG. 1, fluid-dispensing system 400 does not include a faucet. Rather, fluid-dispensing system 400 may be coupled to an existing faucet that does not provide hands-free control of flow rate of fluid exiting the faucet. When coupled to the faucet, fluid-dispensing system 400 provides hands-free control of a flow rate of fluid exiting the faucet.

Fluid control system 402 includes a computer 420, a power supply 422, a first valve subassembly 468 (i.e., a first motor 424, a first valve stem 426, a first coupler 464, and a first valve 428), a second valve subassembly 469 (i.e., a second motor 434, a second valve stem 436, a second coupler 466, and a second valve 438), a wireless transmitter 456, and a leak detection sensor 458, which are substantially similar to their counterparts in FIG. 1B (i.e., computer 120, power supply 122, first valve subassembly 168 (i.e., first motor 124, first valve stem 126, first coupler 164, and first valve 128), second valve subassembly 169 (i.e., second motor 134, second valve stem 136, second coupler 166, and second valve 138), wireless transmitter 156, and leak detection sensor 158).

In a non-operative state of fluid-dispensing system 400, first valve 428 is closed, which blocks, or prevents defining of, a fluidic pathway between hot fluid conduit 409 and first valve conduit 430. Similarly, second valve 438, in a non-operative state, is also closed, which block, or prevents defining of, a fluidic pathway between cold fluid conduit 411 and second valve conduit 440. Thus, during this non-operative state, hot fluid and cold fluid are not transmitted to the coupled faucet.

During an operative state of fluid-dispensing system 400, flow rate controller 406 is engaged by a user. Flow rate controller 406 receives force information from a force-receiving feature (e.g., force-receiving feature 1076 of FIG. 10) and transmits a force signal to fluid control system 402. Computer 420 receives the flow rate signal and facilitates transfer of information regarding an appropriate amount of power to first motor 424 and second motor 434, which opens first valve 428 and second valve 438, respectively. When first valve 428 is open, first valve 428 creates a fluidic pathway through which hot fluid flows from hot fluid conduit 409 to first valve conduit 430. Similarly, when second valve 438 is open, second valve 438 creates a fluidic pathway through which cold fluid flows from cold fluid conduit 411 to second valve conduit 440. As a result, hot fluid from first valve conduit 430 and cold fluid from second valve conduit 440 are conveyed to the coupled faucet.

Figure 5:
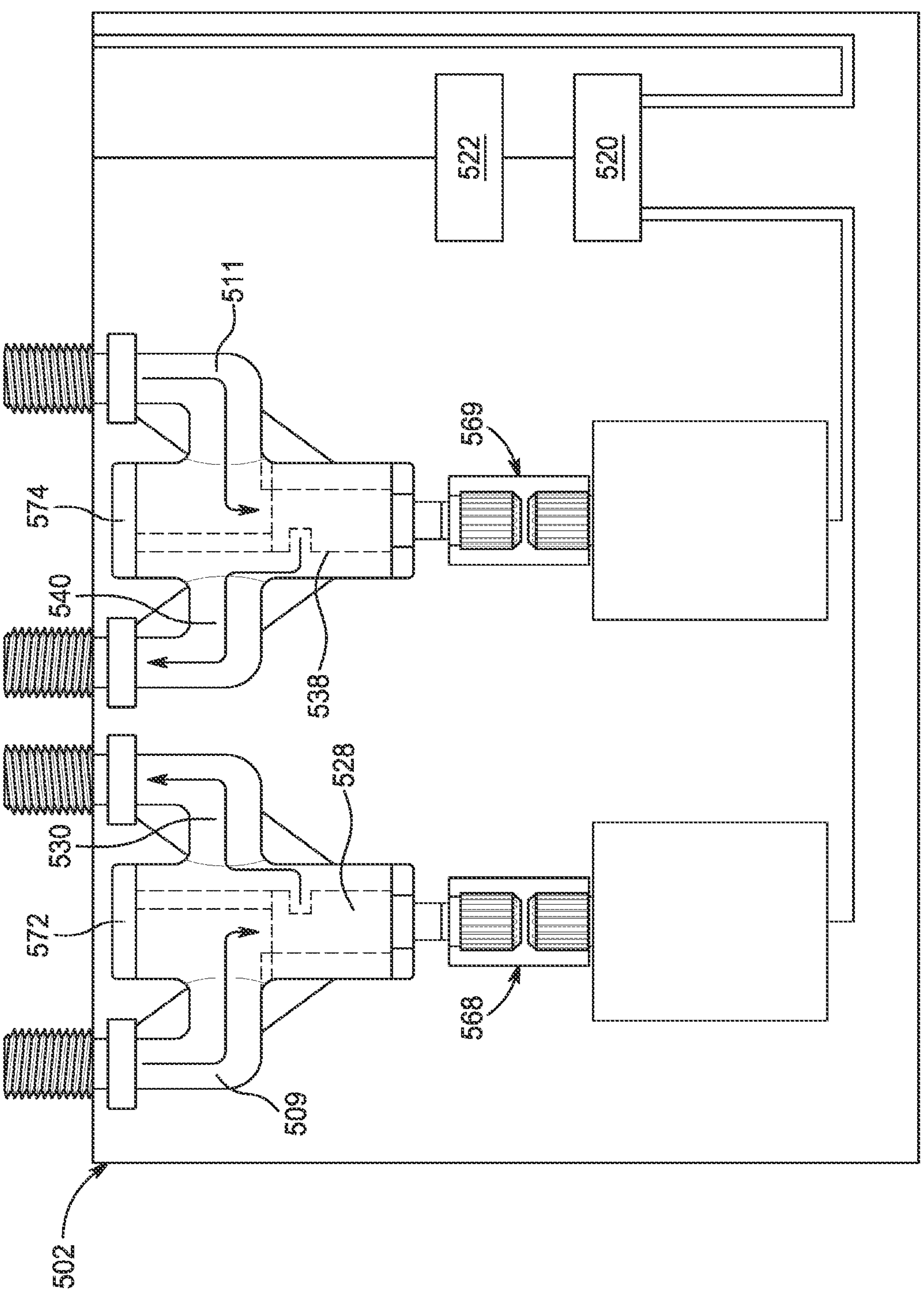
FIG. 5 shows a schematic view of the fluid control system shown in FIG. 4, according to one embodiment of the present arrangements.

FIG. 5 shows a fluid control system 502, according to one embodiment of the present arrangements and that is used in a fluid-dispensing system (e.g., fluid-dispensing system 400 of FIG. 4). A hot fluid conduit 509, a first valve conduit 530, a cold fluid conduit 511, a second valve conduit 540, a computer 520, a power supply 522, a first valve subassembly 568, and a second valve subassembly 569, are substantially similar to their counterparts in FIG. 4 (i.e., hot fluid conduit 409, first valve conduit 430, cold fluid conduit 411, a second valve conduit 440, computer 420, power supply 422, first valve subassembly 468, and second valve subassembly 469). Unlike fluid control system 402 of FIG. 4, however, fluid control system 502 also includes a first fluid manifold 572 (which includes hot fluid conduit 509 and first valve conduit 530) and a second fluid manifold 574 (which includes cold fluid conduit 511 and cold fluid petal conduit 540).

The arrangement of first fluid manifold 572 and second fluid manifold 574 contributes to producing a narrow fluid control system 502. To this end, first fluid manifold 572 and second fluid manifold 574 are linearly arranged adjacent to each other within fluid control system 502 and extend in the same direction. Thus, hot fluid conduit 509, first valve conduit 530, cold fluid conduit 511, and second valve conduit 540 are also linearly arranged and extend in the same direction. First valve subassembly 568, when a portion of first valve 528 is coupled to and disposed within first fluid manifold 572, is linearly arranged with first fluid manifold 572. Second valve subassembly 569, when a portion of second valve 538 is coupled to and disposed within second fluid manifold 574, is also linearly arranged with second fluid manifold 574 and first fluid manifold 572

The linear configuration of fluid control system 502 allows external conduits to couple to first fluid manifold 572 and second fluid manifold 574 along a linear plane at a single surface of fluid control system 502. During installation of fluid control system 502, external conduits may be quickly and easily connected to fluid control system 502 near the same location, which reduces a need for using external conduits of different lengths.

Figure 6A:
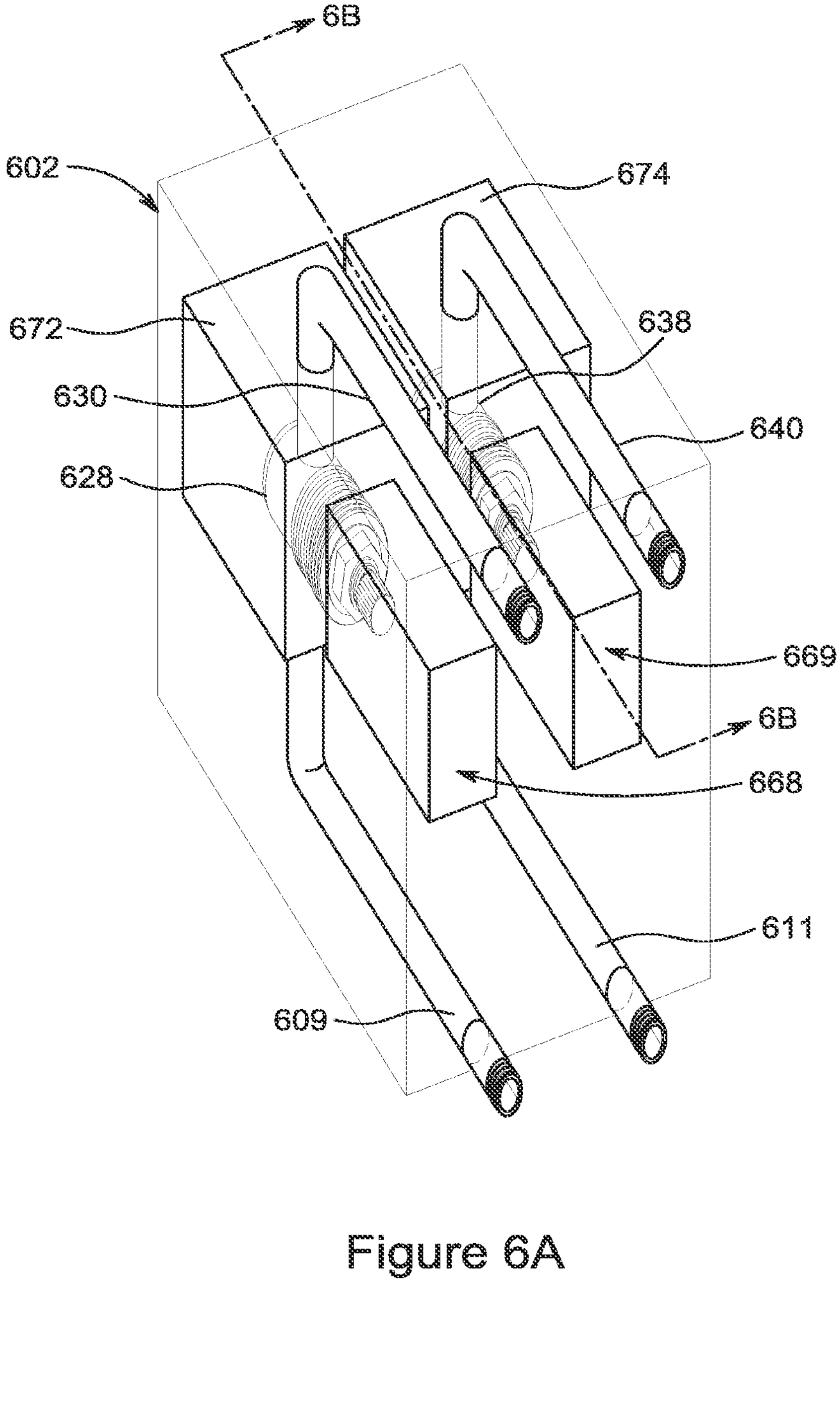
FIG. 6A shows a schematic view of the fluid control system shown in FIG. 4, according to another embodiment of the present arrangements.
Figure 6B:
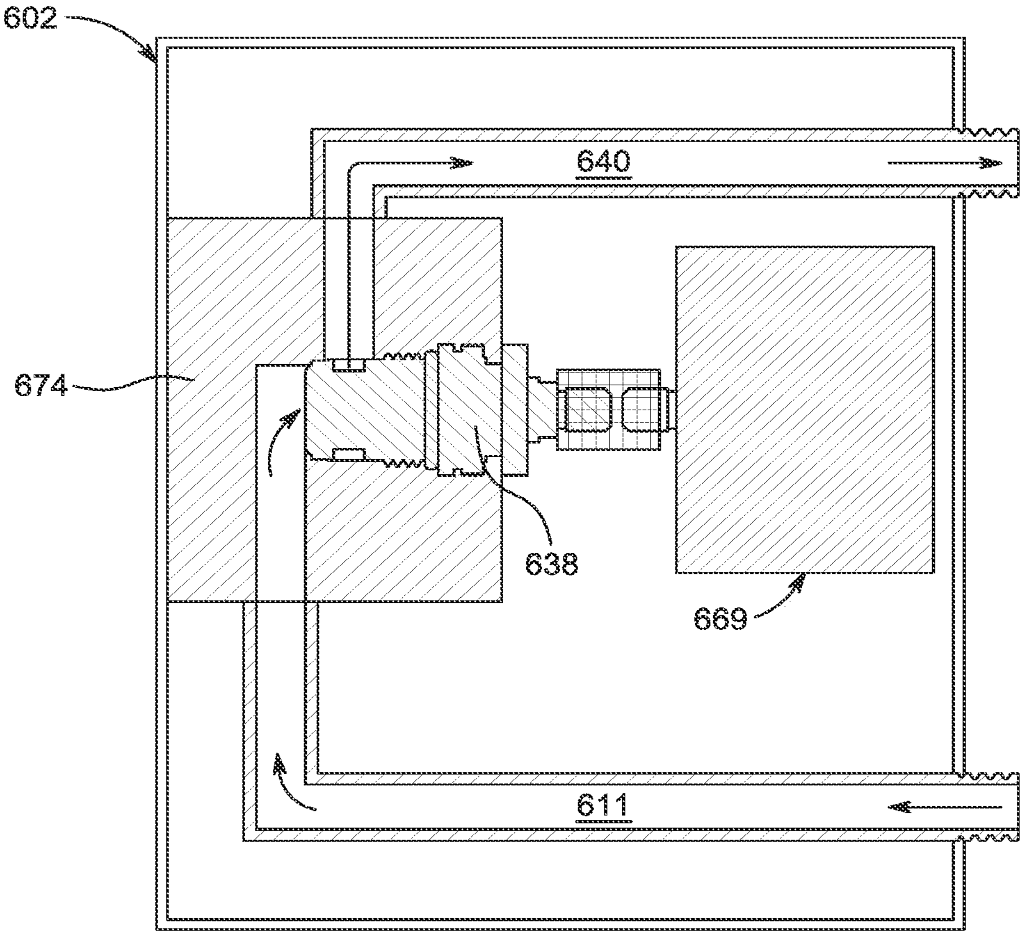
FIG. 6B shows a cross-sectional view of the fluid control system of FIG. 6A.

FIGS. 6A and 6B show a schematic view and a cross-sectional view of a fluid control system 602, respectively, according to another embodiment of the present arrangements and that may be used in a fluid-dispensing system (e.g., fluid-dispensing system 400 of FIG. 4). Similar to fluid control system 502 of FIG. 5, fluid control system 602 includes a first fluid manifold 672 and a second fluid manifold 674. However, unlike in fluid control system 502, first fluid manifold 672 and second fluid manifold 674 couple to external conduits in a compact, nonlinear alignment. First valve conduit 630, of first fluid manifold 672, and second valve conduit 640, of second fluid manifold 674, are linearly arranged adjacent to each other and hot fluid conduit 609 and cold fluid conduit 611 are linearly arranged adjacent to each other. As a result, during installation, external conduits are coupled to first fluid manifold 672 and second fluid manifold 674 on a single surface of fluid control system 602.

The orientation of a first valve 628 and a second valve 638 contribute to a compact fluid control system 602. First valve subassembly 668, when a portion first valve 628 is coupled to and disposed within first fluid manifold 672, extends in the same linear direction as hot fluid conduit 609 and first valve conduit 630 of first fluid manifold 672. Second valve subassembly 669, when a portion second valve 638 is coupled to and disposed within second fluid manifold 674, extends in the same linear direction cold fluid conduit 611 and second valve conduit 640 of second fluid manifold 674. This configuration allows the components of fluid control system 602 to be arranged within a cubical volume, reducing the space needed to install fluid control system 602. By way of example, a space within a kitchen cabinet may be limited due to various components such as a sink, a garbage disposal, a fluid heater, and one or more faucet conduits. Fluid control system 602 contributes to a compact fluid-dispensing system (e.g., fluid-dispensing system 400 of FIG. 4) that may be more easily installed near an associated faucet.

According to one embodiment of the present arrangements, each fluid manifold described above (i.e., fluid manifold 270 of FIG. 2, fluid manifold 370 of FIG. 3, first fluid manifold 572 and second fluid manifold 574 of FIG. 5, and first fluid manifold 672 second fluid manifold 674 of FIGS. 6A and 6B, respectively) is a combination of components assembled to create the manifold. In a preferred embodiment of the present arrangements, however, each fluid manifold is manufactured as single component. Furthermore, in fluid control systems that include two manifolds (i.e., fluid control systems 402 of FIG. 4, 502 of FIG. 5, and 602 of FIGS. 6A and 6B), the first fluid manifold and the second fluid manifold may be fabricated or manufactured together as a single component. Each of these single component fluid manifolds, by way of example, may be manufactured using 3D printing or cast (e.g., die cast, sand cast, centrifugal, or investment cast). Advantages of a single component fluid manifold 270 and 370 in a fluid control system (e.g., fluid control system 102 of FIG. 1A) include reduced assembly costs due to fewer components, fewer locations that may leak fluid, and faster and easier installation due to the use of fewer components to be combined and installed.

Figure 7A:
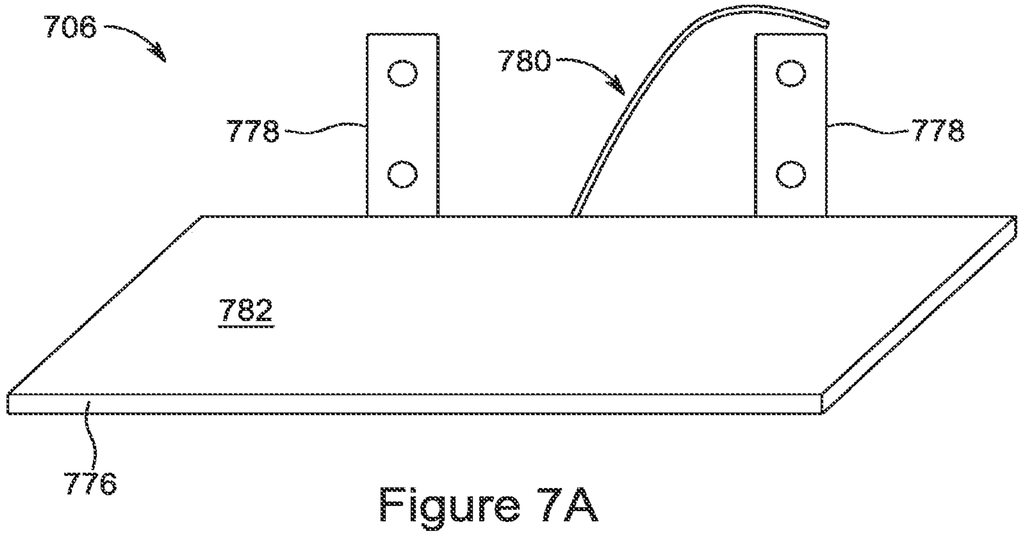
FIG. 7A shows top-perspective view of the flow rate controller of FIGS. 1A and/or 4, according to one embodiment of the present arrangements.
Figure 7B:
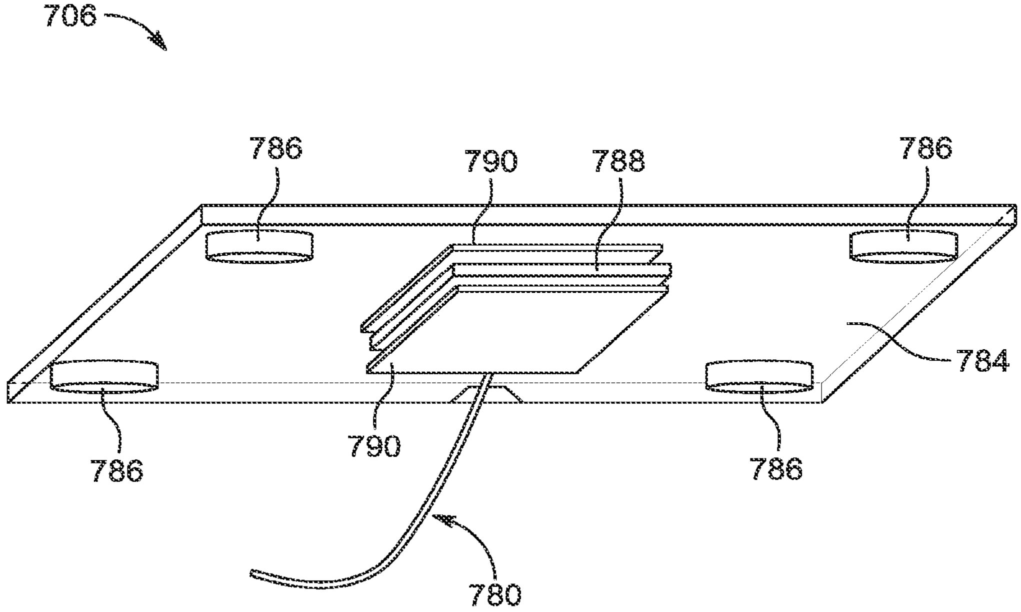
FIG. 7B shows a bottom-perspective view of the flow rate controller of FIG. 7A, according to another embodiment of the present arrangements.

FIGS. 7A and 7B show a top-perspective view and a bottom perspective view, respectively, of a flow rate controller 706, according to one embodiment of the present arrangements. Flow rate controller 706 is substantially similar to flow rate controller 106 of FIGS. 1A-1D and flow rate controller 406 of FIG. 4. Flow rate controller 706 includes a pressure plate 776, and a communication means 780 to transmit information to a fluid control system (e.g., fluid control system 102 of FIG. 1A). In one embodiment of the present arrangements, flow rate controller 706 further includes a pressure plate attachment means 778 to secure pressure plate 776 to a surface. Pressure plate 776 includes a contacting surface 782 designed to receive a force from a user; and a pressure-measuring surface 784 positioned within a recessed region of pressure plate 776 and designed to measure force received by contacting surface 782. Preferably, one or more pressure plate feet 786 are coupled to pressure-measuring surface 784 and extend beyond the recessed portion of pressure plate 776 and contact a rigid surface.

A force-sensing resister 788 is also coupled to pressure-measuring surface 784. Force-sensing resister 788 is coupled to and sandwiched between two or more layers of protective material 790. In one embodiment of the present arrangements, force-sensing resistor 788 measures a deflection distance of pressure plate 776 caused by a force applied to contacting surface 782. By way of example, force-sensing resister 788 may detect a deflection distance that is between about 0.005 inches and about 0.01 inches. In another embodiment of the present arrangements, a force applied to force-sensing resister 788 causes conducting electrodes within force-sensing resister 788 to touch, which reduces the resistance of force-sensing resister 788. In other words, an increase in force on contacting surface 782 reduces the resistance of force-sensing resister 788. The resistance information or deflection information is transmitted from flow rate controller 706 to the fluid control system. In one embodiment of the present arrangements, force-sensing resister 788 is about 1.56 inches wide, about 1.56 inches long, and about 0.2 inches thick.

In another embodiment of the present arrangements, force-sensing resistor 788 and protective material 790 extend beyond the recessed portion of pressure plate 776 and contact the rigid surface. Force-sensing resistor 788 and protective material 790 may extend the same distance as pressure plate feet 786 or beyond. During operation of flow rate controller 706, when a user applies a force to contacting surface 782, the rigid surface applies a pressure to force-sensing resistor 788, which generates a change in resistance that can be transmitted to the fluid control system.

Figure 8A:
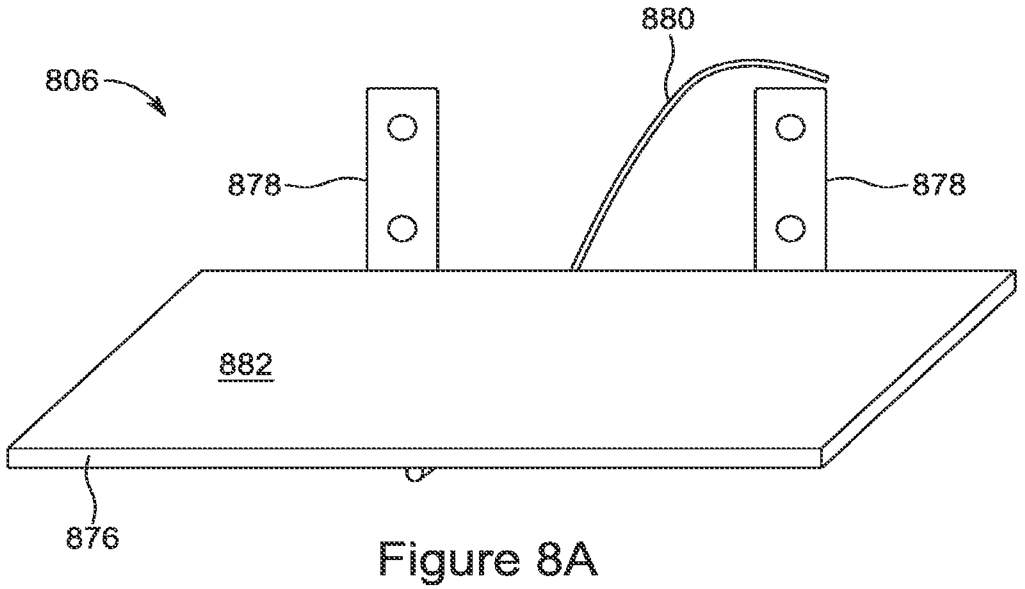
FIG. 8A shows top-perspective view of the flow rate controller of FIGS. 1A and/or 4, according to another embodiment of the present arrangements.
Figure 8B:
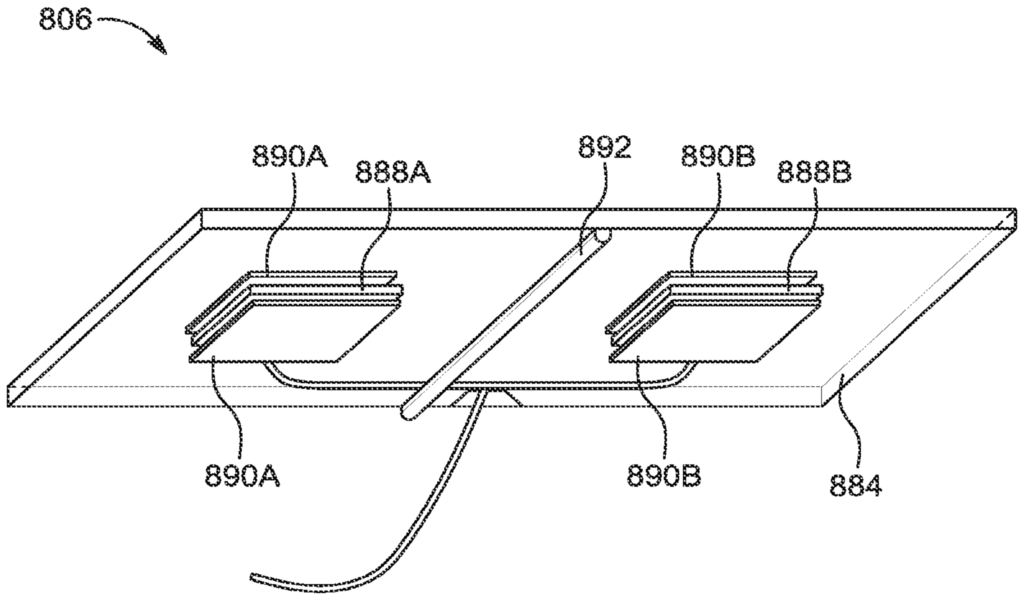
FIG. 8B shows a bottom-perspective view of the flow rate controller of FIG. 8A.

FIGS. 8A and 8B show a top-perspective view and bottom-perspective view, respectively, of a flow rate controller 806, according to another embodiment of the present arrangements. Flow rate controller 806 is substantially similar to flow rate controller 106 of FIGS. 1A-1D and flow rate controller 406 of FIG. 4. Flow rate controller 806 includes a pressure plate 876, a contacting surface 882, a pressure-measuring surface 884, an optional pressure plate attachment means 878, and a communication means 880, which are substantially similar to their counterparts in FIGS. 7A and 7B (i.e., pressure plate 776, contacting surface 782, pressure measuring surface 784, optional pressure plate attachment means 778, and communication means 780). Flow rate controller 806, however, also includes a pivot arm 892 coupled to pressure-measuring surface 884. Pivot arm 892, when in contact with a rigid surface (e.g., a floor), allows flow rate controller 806 to axially pivot along the length of pivot arm 892.

Flow rate controller 806 also includes two force-sensing resistors 888A and 888B, each coupled to and sandwiched between two or more layers of protective material 890A and 890B, respectively. Force-sensing resistors 888A and 888B are positioned on opposing sides of a pivot arm 892. During an operative state of fluid-dispensing system 100 of FIG. 1A or fluid-dispensing system 400 of FIG. 4, force-sensing resistors 888A and 888B work in tandem to generate information that is used to determine fluid flow rate. Additionally, force-sensing resistors 888A and 888B may control temperature by measuring pressure caused by a force on the right portion and/or left portion of pressure plate 876. In other words, force-sensing resistors 888A measures a force on the left side of pressure plate 876 and force-sensing resistors 888B measures a force on the right side of pressure plate 876. During an operative state of fluid-dispensing system 100 of FIG. 1A or fluid-dispensing system 400 of FIG. 4, when a force applied to the left portion of pressure plate 876 is greater than a force applied to the right portion of pressure plate 876, hot fluid is dispersed from a faucet (e.g., faucet 104 of FIG. 1A) and when the force applied to the right portion of pressure plate 876 is greater than the pressure applied to the left portion of pressure plate 876, cold fluid is dispensed from a faucet. The degree of hot or cold fluid dispensed by a faucet is dependent upon the difference in pressure magnitude between the left and right portion of pressure plate 876. In other words, a greater pressure force on the left portion of pressure plate 876 corresponds to hotter fluid being dispensed from the faucet and a greater force on the right portion of pressure plate 876 corresponds to colder fluid being dispensed from the faucet. The pressure measured by 888A and 888B are used by a computer, in combination, to determine a fluid flow rate.

Figure 9A:
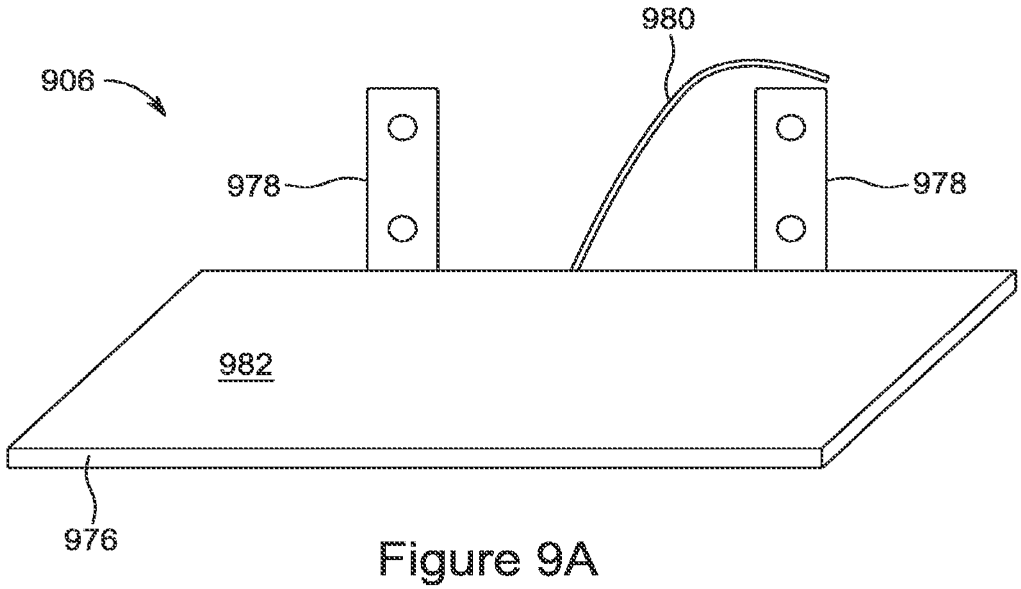
FIG. 9A shows top-perspective view the flow rate controller of FIGS. 1A and/or 4, according to yet another embodiment of the present arrangements.
Figure 9B:
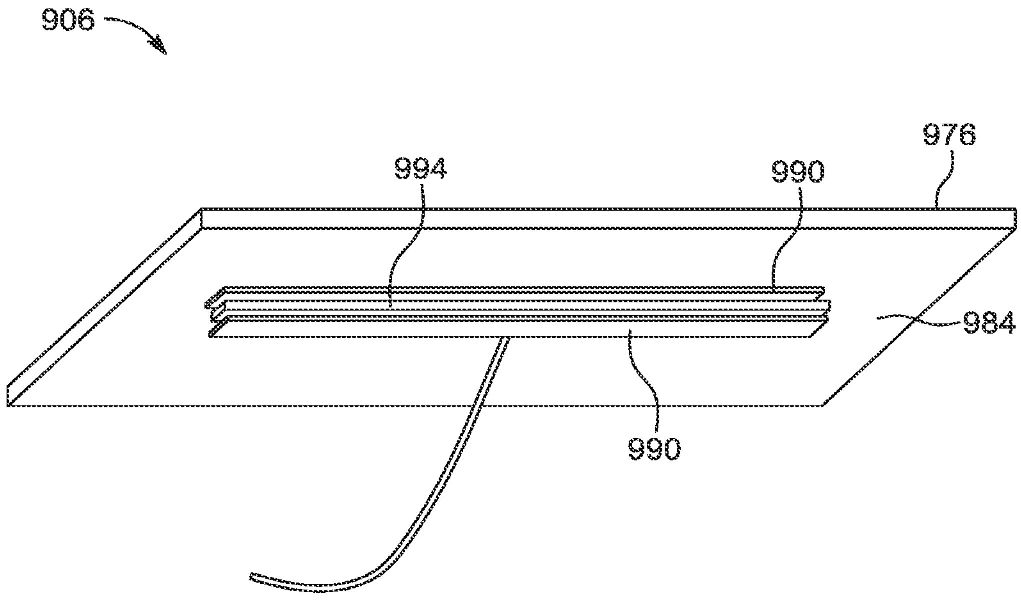
FIG. 9B shows a bottom-perspective view of the flow rate controller of FIG. 9A.

FIGS. 9A and 9B show a top-perspective view and bottom-perspective view, respectively, of a flow rate controller 906, according to yet another embodiment of the present arrangements. Flow rate controller 906 is substantially similar to flow rate controller 106 of FIGS. 1A-1D and flow rate controller 406 of FIG. 4. Flow rate controller 906 includes a pressure plate 976, a pressure plate attachment means 978, a communication means 980, a contacting surface 982, and a pressure-measuring surface 984 that are substantially similar to their counterparts in FIGS. 7A and 7B (i.e., pressure plate 776, optional pressure plate attachment means 778, communication means 780, contacting surface 782, and pressure-measuring surface 784). Flow rate controller 906, however, includes a force-sensing linear potentiometer 994 coupled to and sandwiched by protective material 990. Force-sensing linear potentiometer 994 detects a magnitude of force and the location of the force along potentiometer 994. During an operative state a fluid-dispensing system of the present arrangements, flow rate controller 906 provides information to fluid control system (e.g., fluid control system 102 of FIG. 1A) to dispense fluid at a particular flow rate and temperature, depending of the force applied to pressure plate 976 and the location of the force along the length of force-sensing linear potentiometer 994.

Fluid dispensed from a faucet has a hotter temperature as pressure is applied farther to the left of pressure plate 976, and the fluid has a cooler temperature as pressure is applied farther to the right on pressure plate 976. Fluid flow rate is determined by a force of pressure against pressure-measuring surface 985 at any location.

Figure 10:
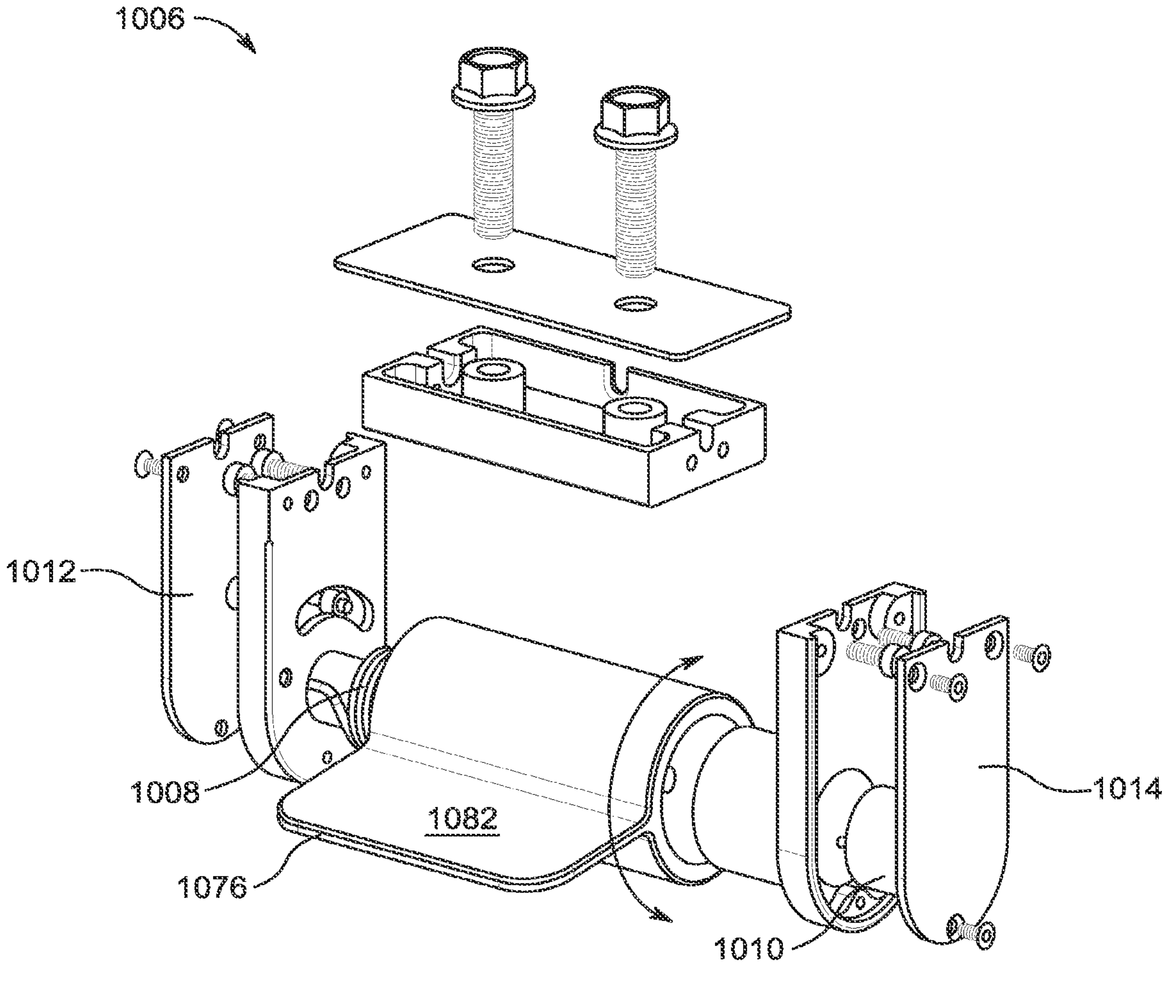
FIG. 10 shows an exploded view of the flow rate controller of FIGS. 1A and/or 4, according to yet another embodiment of the present arrangements.

FIG. 10 shows a flow rate controller 1006, according to yet another embodiment of the present arrangements and that is substantially similar to flow rate controller 106 of FIGS. 1A-1D and flow rate controller 406 of FIG. 4. Flow rate controller 1006 includes a force-receiving feature 1076 that is rotatably coupled, on one end, to a flow rate controller arm 1012 and, on another end, to a flow rate controller arm 1014. In an assembled configuration, force-receiving feature 1076 rotates around an axis that runs through force-receiving feature 1076 and that is perpendicular to flow rate controller arms 1012 and 1014.

A flow rate controller spring 1008, coupled to flow rate controller arm 1012 and force-receiving feature 1076, holds force-receiving feature 1076 in a non-engaged position (i.e., when force-receiving feature 1076 is not engaged by a user). During an operative state of flow rate controller 1006, a force applied to contacting surface 1082, causes force-receiving feature 1076 to rotate along its axis. Flow rate controller spring 1008 provides resistance to the user's force, such that when the user removes the force from contacting surface 1082, force-receiving feature 1076 returns to the non-engaged position. A flow rate encoder, housed within flow rate controller arm 1014 and communicatively coupled to force-receiving feature 1076, measures angular movement of force-receiving feature 1076 caused by a magnitude of force on force-receiving feature 1076. As discussed above, a fluid-dispensing system (e.g., fluid-dispensing system 100 of FIG. 1A) uses angular deflection, measured by flow rate encoder 1010, to adjust fluid flow rates through a first valve and a second valve.

In another embodiment of the present arrangements, flow rate controller 1006, in addition to adjusting fluid flow rate, adjusts temperature of the fluid flow dispensed from a faucet. By way of example, a temperature encoder, one or more force sensing resistors (e.g., force sensing resistors 888A and 888B), or a force sensing linear potentiometer (e.g., force sensing linear potentiometer 994), as described above, may be coupled to force-receiving feature 1076. A user, using flow rate controller 1106, may adjust the temperature of fluid flow by adjusting a location where force (i.e., a left and right portion) is applied to force-receiving feature 1076 and the magnitude of force applied to force-receiving feature 1076. In a preferred embodiment of the present arrangements, a force applied to the left portion of force-receiving feature 1076 reduces the fluid flow temperature and a pressure applied to the right portion of force-receiving feature 1076 increases the fluid flow temperature.

A water dispensing system having flow rate controller configured to adjust fluid flow rate and fluid temperature, may include additional features to turn on or turn off that ability of flow rate controller to adjust fluid temperature. This may be thought of as a safety feature to prevent the user or another entity from accidently adjusting the temperature using the flow rate controller. By way of example, if the temperature controller adjusted to be within into a predefined position or range of positions, the flow rate controller may be used to control fluid temperature. However, if the temperature controller is not in this predefined position or range of positions, the temperature controller will override the temperature control function of flow rate controller. In this operative state, the flow rate controller will control flow rate of the fluid but not fluid temperature.

Figure 11:
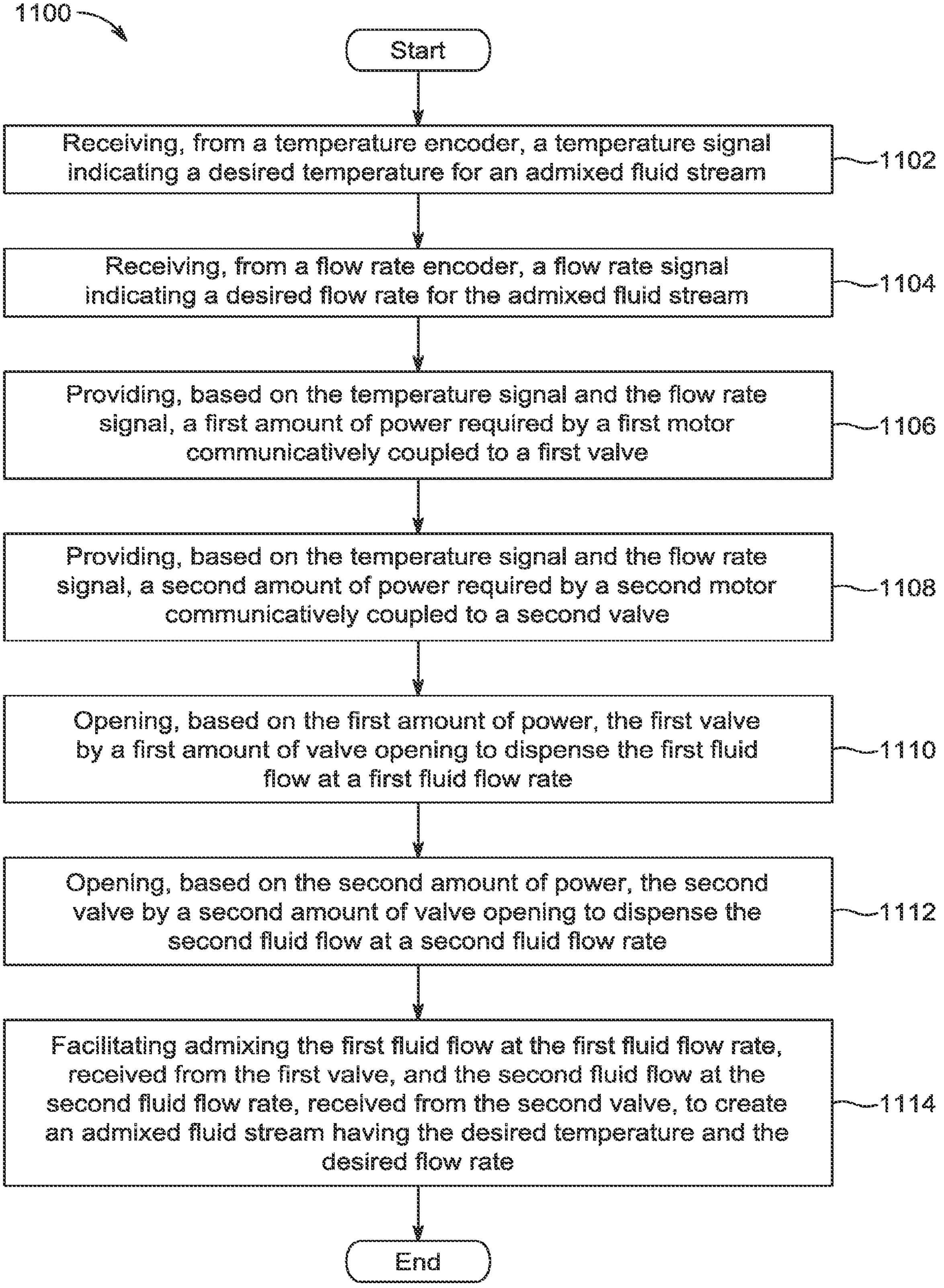
FIG. 11 shows a method, according to one embodiment of the present teachings, of dispensing fluid.

The present teachings also offer, among other things, methods of dispensing fluid. FIG. 11 shows a method of dispensing fluid 1100, according to one embodiment of the present teachings. Method 1100 may begin with a step 1102, which includes receiving, from a temperature encoder a temperature signal indicating a desired temperature for an admixed fluid stream.

A temperature encoder, in one embodiment of the present teachings, is disposed within or coupled to a temperature controller (e.g., temperature controller 116 of FIG. 1A). In this configuration, step 1102 my further include a step of receiving from the temperature controller the desired temperature of the admixed fluid stream. By way of example, a user may rotate the temperature controller to a position that is commensurate with the user's desired temperature for an admixed fluid. The temperature encoder receives and/or identifies the position of the handle or knob and converts that position into a temperature signal. A computer (e.g., computer 120 of FIG. 1B), in one embodiment of the present teachings, receives the temperature signal from the temperature encoder. In a preferred embodiment of the present teachings, the step of receiving the desired flow rate is carried out before the step of receiving the flow rate signal.

Next, or contemporaneously with step 1102, a step 1104 is carried out. This step includes receiving, from a flow rate encoder (e.g., flow rate encoder 1010 of FIG. 10), a flow rate signal indicating a desired flow rate for the admixed fluid stream. In a preferred embodiment of the present teachings, the flow rate encoder is disposed within a flow rate controller (e.g., flow rate controller 106 of FIG. 1A). Step 1104, in one embodiment of the present teachings, further include a step of receiving from the flow rate controller the desired flow rate of the admixed fluid stream. Preferably, this step is carried out prior the step of receiving the flow rate signal. By way of example, a user may exert a force on a force-receiving feature (e.g., force-receiving feature 1076 of FIG. 10) of the flow rate controller, which causes the force-receiving feature to change positions. The flow rate encoder receives and/or identifies the position of the force-receiving features and converts that position into the flow rate signal. Thus, the magnitude of force exerted on the force receiving is commensurate with a desired flow rate for the admixed fluid stream.

Next, a step 1106 includes providing, based on the temperature signal and the flow rate signal, a first amount of power required by a first motor communicatively coupled to a first valve. In an operative state, the first valve dispenses a first fluid flow that is at a first temperature.

Next, or contemporaneously with step 1106, a step 1108 is performed. This step includes providing, based on the temperature signal and the flow rate signal, a second amount of power required by a second motor communicatively coupled to a second valve. In an operative state, the second valve dispenses a second fluid flow that is at a second temperature.

Step 1106 and/or 1108, in one embodiment of the present teachings, further include a "computing step" and a "conveying step". The computing step includes computing, based on the temperature signal and the flow rate signal, information regarding the first amount of power required by the first motor and information regarding the second amount of power required by the second motor. The conveying step includes conveying the amount of power to the first motor to open the first valve by a first amount and the second amount of power to the second motor to open the second valve by a second amount. The first amount of power dispenses the first fluid flow from the first valve at a first fluid flow rate and the second amount of power dispenses the second fluid flow from the second valve at the second fluid flow rate.

Method 1100 may then proceed to a step 1110, which includes opening, based on the amount of power, the first valve by a first amount of valve opening to dispense the first fluid flow at the first fluid flow rate.

Next, or contemporaneously with step 1110, a step 1112 is carried out. Step 1112 includes opening, based on the second amount of power, the second valve by the second amount of valve opening to dispense the second fluid flow at the second fluid flow rate.

A step 1114 includes facilitating admixing of the first fluid flow at the first fluid flow rate and the second fluid flow at the second fluid flow rate to create an admixed fluid stream. This admixed fluid stream has the desired temperature and the desired flow rate. The first fluid flow at the first fluid flow rate and the second fluid flow at the second fluid flow rate may be admixed in a junction (e.g., junction 150 of FIG. 1B) of an admixed conduit (e.g., admixed fluid conduit 152 of FIG. 1B). The admixed fluid may then be transmitted, though the admixed conduit, to a faucet.

It is noteworthy that the desired temperature, which is commensurate with the position of the temperature controller set by the user, is produced by a combination of the first fluid flow and the second fluid flow. Similarly, the desired flow rate of the admixed fluid stream, which is commensurate with magnitude of force the user exerts on the force-receiving feature the flow rate controller, is the sum of the first fluid flow rate and the second fluid flow rate. Thus, present teachings provide for hands-free control of fluid flow at a desired flow rate and at a desired temperature.

In one instance, the magnitude of force exerted on the flow rate controller by a user may correspond to a fluid flow rate that exceeds the combination of the first fluid flow rate and the second fluid flow rate or exceed a predefined flow rate of the admixed fluid stream. To this end, the present teachings provide a method of limiting the flow rate of the admixed fluid stream when the user exerts a magnitude of force that exceeds a predefined magnitude of force. In one embodiment of the present teachings, if the magnitude of force received by the flow rate controller exceeds a predefined magnitude of force, the flow rate encoder generates a predefined flow rate signal, rather than produce the flow rate signal that is commensurate with the magnitude of the force. In other words, the flow rate encoder will not transmit a flow rate signal that exceeds the predefined threshold. Instead, the flow rate encoder will transmit the flow rate signal commensurate with the certain predefined magnitude of force. Thus, the flow rate of the admixed fluid stream that corresponds to a force above the predetermined threshold is the same as the admixed fluid stream flow rate obtained by receiving the predefined magnitude of force.

In the receiving the flow rate signal step (i.e., step 1104) discussed above, when a user exerts a force on a flow rate controller that exceeds a predefined magnitude of force, this step includes receiving a flow rate signal that is substantially similar to the flow rate signal of the admixed fluid stream obtained by receiving the predefined magnitude of force.

Although illustrative embodiments of the present teachings and arrangements are shown and described in terms of controlling fluid within a sewer system, other modifications, changes, and substitutions are intended. Accordingly, it is appropriate that the disclosure be construed broadly and in a manner consistent with the scope of the disclosure, as set forth in the following claims.

What is claimed is:

1. A fluid dispensing system, comprising:

a computer that determines a first amount of power, based on a temperature signal that is commensurate with a desired temperature for an admixed fluid stream and a flow rate signal that is commensurate with a desired admixed flow rate for said admixed fluid stream, and a second amount of power, based on said temperature signal that is commensurate with said desired temperature for said admixed fluid stream and said flow rate signal that is commensurate with said desired admixed flow rate for said admixed fluid stream;

a first motor coupled to said computer, such that said first amount of power is conveyed to said first motor, which in an operative state, generates power for a first amount of valve opening to dispense a first fluid stream at a first temperature;

a second motor coupled to said computer, such that said second amount of power is conveyed to said second motor, which in an operative state, generates power for a second amount of valve opening to dispense a second fluid stream at a second temperature;

a first fluid valve coupled to said first motor, such that power for said first amount of valve opening generated by said first motor is implemented at said first fluid valve, which in an operative state, dispenses said first fluid stream at said first temperature through said first amount of valve opening;

a second fluid valve coupled to said second motor, such that power for said second amount of valve opening generated by said second motor is implemented at said second fluid valve, which in an operative state, dispenses said second fluid stream at said second temperature through said second amount of valve opening; and an admixed fluid conduit, coupled to said first fluid valve and said second fluid valve, which in an operative state, dispenses said admixed fluid stream at said desired admixed flow rate, wherein said admixed fluid stream results from admixing of said first fluid stream at said first temperature and said second fluid stream at said second temperature at said admixed fluid conduit, and wherein said desired admixed flow rate and said desired temperature for said admixed fluid stream results from admixing said first fluid stream of at said first temperature dispensed from said first amount of valve opening and said second fluid stream of at said second temperature dispensed from said second amount of valve opening.

2. The fluid dispensing system of claim 1, further comprising a first splitter having a first dispensing end and second dispensing end, said first dispensing end is designed to be coupled with a faucet and said second dispensing end is coupled with said first fluid valve such that said first fluid stream of said first temperature present at said first fluid splitter is conveyed to said first fluid valve, which in an operative state, dispenses said first fluid stream at said first temperature through said first amount of valve opening.

3. The fluid dispensing system of claim 2, further comprising a second splitter having a first dispensing end and second dispensing end, said first dispensing end is designed to be coupled with said faucet and said second dispensing end is coupled with said second fluid valve such that said second fluid stream of said second temperature present at said second fluid splitter is conveyed to said second fluid valve, which in an operative state, dispenses said second fluid stream at said second temperature through said second amount of valve opening.

4. The fluid dispensing system of claim 3, wherein during an operative state, when said first motor and said second motor do not receive information regarding said first amount of power and said second amount of power, respectively, said fluid stream at said first temperature is dispensed from said first dispensing end of said first splitter and said second fluid stream at said second temperature is dispensed from said first dispensing end of said second splitter.

5. The fluid dispensing system of claim 1, further comprising a temperature controller that receives a desired temperature setting for said admixed fluid stream that is commensurate with said desired temperature for said admixed fluid stream.

6. The fluid dispensing system of claim 5, further comprising a temperature encoder coupled to said temperature controller and said computer, such that said desired temperature setting received at said temperature controller, is conveyed to said temperature encoder, and in an operative state of said temperature controller and said temperature encoder, said temperature encoder, based on said desired temperature setting received at said temperature controller, generates said fluid temperature signal that is commensurate with said desired temperature for said admixed fluid stream.

7. The fluid dispensing system of claim 6, wherein said temperature encoder is a magnetic encoder or an optical encoder.

8. The fluid dispensing system of claim 5, wherein said temperature controller further includes a lockout mechanism that prevents said flow rate controller from transmitting information to said computer.

9. The fluid dispensing system of claim 1, further comprising a flow rate controller that is designed to receive a force of certain magnitude, and based on said force of certain magnitude received, said fluid dispensing system, in an operative state, dispenses said admixed fluid stream at said desired admixed flow rate that correlates with said force of certain magnitude received at said flow rate controller.

10. The fluid dispensing system of claim 9, further comprising a flow rate encoder coupled to said flow rate controller and said computer, such that said force of certain magnitude, received at said flow rate controller, is conveyed to said flow rate encoder, and in an operative state of said flow rate controller and said flow rate encoder, based on said force of certain magnitude, generates said flow rate signal that is commensurate with said desired admixed flow rate for said admixed fluid stream.

11. The fluid dispensing system of claim 9, wherein said flow rate controller is a pressure plate.

12. The fluid dispensing system of claim 11, wherein said pressure plate includes an internal battery and a wireless transmitter.

13. The fluid dispensing system of claim 1, further comprising a power supply that, in an operative state, transmits power to said computer and wherein said computer transmits said first amount of power to said first motor and transmits said second amount of power to said second motor.

14. The fluid dispensing system of claim 13, wherein said power supply is AC power or a battery pack.

15. The fluid dispensing system of claim 1, wherein said computer, said first valve, said second valve, and said first and said second motor are enclosed within a single fluid-proof housing.

16. The fluid dispensing system of claim 15, wherein said fluid-proof housing includes fluid leak detection device that generates an acoustic alarm when a said fluid leak detection device detects a fluid leak.

17. The fluid dispensing system of claim 1, further comprising an emergency shutoff valve that prevents transmission of said first fluid stream of first temperature from said first valve to said admixed fluid conduit and prevents transmission of said second fluid stream of said second temperature from said second valve to said admixed fluid conduit.

18. The fluid dispensing system of claim 1, further comprising a fluid metering device to record said admixed flow rate and/or an admixed fluid volume of said admixed fluid stream that is dispensed through said admixed fluid conduit.

19. The fluid dispensing system of claim 1, further comprising a wireless transmitter for transmitting information to a remote device.

20. A fluid dispensing system of claim 1, further comprising a second splitter having a first dispensing end and second dispensing end, said first dispensing end is designed to be coupled with said faucet and said second dispensing end is coupled with said second fluid valve such that said second fluid stream of said second temperature present at said second fluid splitter is conveyed to said second fluid valve, which in an operative state, dispenses said second fluid stream at said second temperature through said second amount of valve opening.

21. A fluid dispensing system, comprising:

a computer that determines a first amount of power, based on a temperature signal that is commensurate with a desired temperature for an admixed fluid stream and a flow rate signal that is commensurate with a desired admixed flow rate for said admixed fluid stream, and a second amount of power, based on said temperature signal that is commensurate with said desired temperature for said admixed fluid stream and said flow rate signal that is commensurate with said desired admixed flow rate for said admixed fluid stream;

a first motor coupled to said computer, such that said first amount of power is conveyed to said first motor, which in an operative state, generates power for a first amount of valve opening to dispense a first stream at a first temperature;

a second motor coupled to said computer, such that said second amount of power is conveyed to said second motor, which in an operative state, generates power for a second amount of valve opening to dispense a second stream at a second temperature;

a first fluid valve coupled to said first motor, such that power for said first amount of valve opening generated by said first motor is implemented at said first fluid valve, which in an operative state, dispenses said first fluid stream at said first temperature through said first amount of valve opening;

a second fluid valve coupled to said second motor, such that power for said second amount of valve opening generated by said second motor is implemented at said second fluid valve, which in an operative state, dispenses said second fluid stream at said second temperature through said second amount of valve opening;

an admixed fluid conduit, coupled to said first fluid valve and said second fluid valve, which in an operative state, dispenses said admixed fluid stream at an admixed flow rate, wherein said admixed fluid stream results from admixing of said first fluid stream at said first temperature and said second fluid stream at second temperature at said admixed fluid conduit, and wherein said admixed flow rate and said desired temperature for said admixed fluid stream results from admixing said first fluid stream at said first temperature dispensed from said first amount of valve opening and said second fluid stream at said second temperature dispensed from said second amount of valve opening; and a flow rate encoder coupled to said computer that, in an operative state of said flow rate encoder and based on a force of certain magnitude conveyed to said flow rate encoder, generates said ow rate signal that is commensurate with said desired admixed flow rate for said admixed fluid stream.

* * * * *